US011563620B2

(12) United States Patent
Paz et al.

(10) Patent No.: US 11,563,620 B2
(45) Date of Patent: Jan. 24, 2023

(54) SINGLE CARRIER MULTI-LEVEL CODING AMPLITUDE PHASE SHIFT KEYING WAVEFORM

(71) Applicant: QUALCOMM Incorporated, San Diego, CA (US)

(72) Inventors: Daniel Paz, Geva Carmel (IL); Michael Levitsky, Rehovot (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/344,697

(22) Filed: Jun. 10, 2021

(65) Prior Publication Data
US 2022/0400044 A1    Dec. 15, 2022

(51) Int. Cl.
*H04L 27/28* (2006.01)
*H04L 27/34* (2006.01)
*H04W 8/24* (2009.01)
*H04B 7/06* (2006.01)
*H04L 27/26* (2006.01)

(52) U.S. Cl.
CPC .......... *H04L 27/28* (2013.01); *H04B 7/0626* (2013.01); *H04L 27/2615* (2013.01); *H04L 27/3411* (2013.01); *H04W 8/24* (2013.01)

(58) Field of Classification Search
CPC ........ H04B 7/0626; H04W 8/24; H04L 27/28; H04L 27/2615; H04L 27/3411; H04L 27/34
See application file for complete search history.

(56) References Cited

U.S. PATENT DOCUMENTS

2006/0203941 A1* 9/2006 Borran ............... H04L 27/3405
  375/346
2009/0245397 A1* 10/2009 Moffatt ............... G06F 17/142
  375/260

(Continued)

OTHER PUBLICATIONS

WO 2021057948 A1 (with English translation); Sep. 19, 2022 (Year: 2022).*

(Continued)

*Primary Examiner* — Benjamin H Elliott, IV
(74) *Attorney, Agent, or Firm* — Arun Swain; Holland & Hart LLP

(57) ABSTRACT

Methods, systems, and devices for wireless communications are described that support a single carrier multi-level coding (MLC) amplitude phase shift keying (APSK) modulated waveform. For example, a user equipment (UE) capable to communicate using MLC APSK modulated waveforms may transmit a channel state information (CSI) report, including a recommendation for a waveform configuration, to a base station. The base station may receive the CSI report and may transmit a configuration message to the UE, which may configure the UE with a set of waveform parameters associated with MLC APSK modulation. The UE may receive the configuration message and may communicate with the base station using MLC APSK modulated waveforms and based on the set of waveform parameters, which may reduce phase noise and provide lower peak average power ratio (PAPR) signaling.

30 Claims, 19 Drawing Sheets

(56) References Cited

U.S. PATENT DOCUMENTS

| | | | |
|---|---|---|---|
| 2015/0163085 A1* | 6/2015 | Stadelmeier | H04L 1/0041 375/298 |
| 2015/0358116 A1* | 12/2015 | Khayrallah | H04L 1/0054 375/341 |
| 2017/0311331 A1* | 10/2017 | Chae | H04L 25/0222 |
| 2017/0353340 A1* | 12/2017 | Raphaeli | H04L 1/0068 |
| 2018/0212806 A1* | 7/2018 | Al-Dweik | H04B 1/10 |
| 2019/0068320 A1* | 2/2019 | Vojcic | H03M 13/2906 |
| 2020/0274647 A1* | 8/2020 | Shevchenko | H04L 1/1819 |
| 2021/0281466 A1* | 9/2021 | Loghin | H04L 1/0045 |
| 2021/0376916 A1* | 12/2021 | Knopp | H04B 7/18515 |
| 2022/0014316 A1* | 1/2022 | Levitsky | H04L 1/1864 |
| 2022/0116253 A1* | 4/2022 | Qin | H04L 27/2602 |

OTHER PUBLICATIONS

CN 101867437 B (with English translation); Sep. 19, 2022 (Year: 2022).*

"Constellation Design for Future Communication Systems: A Comprehensive Survey"; Barrueco et al.; IEEE Access vol. 9; Jun. 21, 2021 (Year: 2021).*

"Multilevel Coded Modulation With Reduced Latency Decoding Based on Novel Set Partitioning for APSK"; Yoda et al.; IEEE Transactions On Broadcasting, vol. 61, No. 4, Dec. 2015 (Year: 2015).*

"Phase Shifted Multilevel Amplitude-Shift Keying for 100 GB/s Ethernet Applications"; Kwok et al.; 2008 Conference on Lasers and Electro-Optics and 2008 Conference on Quantum Electronics and Laser Science; May 4, 2008 (Year: 2008).*

"Performance Evaluation of mm-Wave RoF Systems Using APSK Modulation"; Mohamed et al.; Proceedings of the International Conference on Advanced Intelligent Systems and Informatics 2019 pp. 891-900; 2019 (Year: 2019).*

"Digital Video Broadcasting (DVB); Second generation framing structure, channel coding and modulation systems for Broadcasting, Interactive Services, News Gathering and other broadband satellite applications; Part 2: S2-Extensions (DVB-S2X)"; Oct. 2019 (Year: 2019).*

Second generation framing structure, channel coding and modulation systems for Broadcasting, Interactive Services, News Gathering and other broadband satellite applications; Part 2: DVB-S2 Extensions (DVB-S2X) DVB Document A082-2 Rev.2 (Year: 2021).*

WO 2020/079259 A1 (w/English translation) (Year: 2020).*

"Draft ETSI EN 302 307-2 V1.1.1 (Oct. 2014) Digital Video Broadcasting (DVB); Second generation framing structure, channel coding and modulation systems for Broadcasting, Interactive Services, News Gathering and other broadband satellite applications (DVB-S2); Part 2: DVB-S2 Extensions (DVB-S2X)" (Year: 2014).*

International Search Report and Written Opinion—PCT/US2022/032770—ISA/EPO—dated Oct. 24, 2022.

MTI: "Discussion on CSI Feedback for LEO Satellites in NTN", 3GPP TSG-RAN WG1 Meeting AH-1901, R1-1900819, 3rd Generation Partnership Project, Mobile Competence Centre, 650, Route Des Lucioles, F-06921 Sophia-Antipolis Ce, vol. RAN WG1, No. Taipei, Taiwan, Jan. 21, 2019-Jan. 25, 2019, 11 Pages, Jan. 12, 2019, XP051576357, Sect. 2.2, figures 3-7.

Wachsmann U., et al., "Multilevel Codes: Theoretical Concepts and Practical Design Rules", IEEE Transactions on Information Theory, vol. 45, No. 5, Jul. 1, 1999 (Jul. 1, 1999), pp. 1361-1391, XP055969526, USA, ISSN: 0018-9448, DOI: 10.1109/18.771140, the whole document.

Yoda D., et al., "A Reduced-Complexity Multilevel Coded Modulation for APSK Signalling", 2013 IEEE International Symposium on Information Theory, Jul. 1, 2013, pp. 1994-1998, XP055969112, DOI: 10.1109/ISIT.2013.6620575, ISBN: 978-1-4799-0446-4, Sect.s I and IV.

* cited by examiner

SINGLE CARRIER MULTI-LEVEL CODING AMPLITUDE PHASE SHIFT KEYING WAVEFORM

TECHNICAL FIELD

The following relates to wireless communications, including a single carrier multi-level coding (MLC) amplitude phase shift keying (APSK) waveform.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include base stations or network access nodes, each simultaneously supporting communication for multiple communication devices, which may be otherwise known as user equipment (UE).

In some wireless communications systems, devices may communicate with communication links, which may be subject to channel impairments. For example, a UE and a base station may communicate with one another using relatively high frequency band communication links in which the UE and base station may experience channel distortions, phase noise, or non-linear signal behavior (or any combination thereof), among other channel impairments. In some cases, one or more of these channel impairments may be dominant channel impairments (for example, impairments having more influence over channel conditions or causing greater distortion) compared to other channel impairments.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method may include transmitting, to a base station, a channel state information (CSI) report indicating a multi-level coding (MLC) amplitude phase shift keying (APSK) modulated waveform, receiving, from the base station, an indication of a set of one or more waveform parameters for the MLC APSK modulated waveform based on the CSI report, and communicating with the base station using the MLC APSK modulated waveform based on the set of one or more waveform parameters.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to transmit, to a base station, a CSI report indicating a MLC APSK modulated waveform, receive, from the base station, an indication of a set of one or more waveform parameters for the MLC APSK modulated waveform based on the CSI report, and communicate with the base station using the MLC APSK modulated waveform based on the set of one or more waveform parameters.

Another innovative aspect of the subject matter described in this disclosure can be implemented in an apparatus for wireless communications at a UE. The apparatus may include means for transmitting, to a base station, a CSI report indicating a MLC APSK modulated waveform, means for receiving, from the base station, an indication of a set of one or more waveform parameters for the MLC APSK modulated waveform based on the CSI report, and means for communicating with the base station using the MLC APSK modulated waveform based on the set of one or more waveform parameters.

Another innovative aspect of the subject matter described in this disclosure can be implemented in a non-transitory computer-readable medium storing code for wireless communications at a UE. The code may include instructions executable by a processor to transmit, to a base station, a CSI report indicating a MLC APSK modulated waveform, receive, from the base station, an indication of a set of one or more waveform parameters for the MLC APSK modulated waveform based on the CSI report, and communicate with the base station using the MLC APSK modulated waveform based on the set of one or more waveform parameters.

In some examples of the method, apparatuses, and non-transitory computer-readable medium described herein, receiving the indication of the set of one or more waveform parameters may include operations, features, means, or instructions for receiving an indication of a modulation and coding scheme (MCS) table and an index to the MCS table, the method further including and selecting the set of one or more waveform parameters from the MCS table based on the index.

In some examples of the method, apparatuses, and non-transitory computer-readable medium described herein, receiving the indication of the set of one or more waveform parameters may include operations, features, means, or instructions for receiving an indication of a configuration for a MLC APSK constellation associated with the MLC APSK modulated waveform.

In some examples of the method, apparatuses, and non-transitory computer-readable medium described herein, receiving the indication of the set of one or more waveform parameters may include operations, features, means, or instructions for receiving an indication that the MLC APSK modulated waveform may be configured for multi-stage decoding (MSD) or parallel-independence decoding (PID).

In some examples of the method, apparatuses, and non-transitory computer-readable medium described herein, receiving the indication of the set of one or more waveform parameters may include operations, features, means, or instructions for receiving an indication of an MCS table of a set of multiple MCS tables, where the MCS table includes a set of multiple sets of one or more waveform parameters including the set of one or more waveform parameters.

In some examples of the method, apparatuses, and non-transitory computer-readable medium described herein, receiving the indication of the set of one or more waveform parameters may include operations, features, means, or instructions for receiving the indication of the set of one or more waveform parameters via a downlink control information (DCI) message, radio resource control (RRC) signaling, a medium access control (MAC) control element (CE), or any combination thereof.

Some examples of the method, apparatuses, and non-transitory computer-readable medium described herein may further include operations, features, means, or instructions for determining that a signal-to-noise ratio (SNR) of a wireless channel between the UE and the base station satisfies an SNR threshold, where the communicating with the base station using the MLC APSK modulated waveform may be based on satisfaction of the SNR threshold.

In some examples of the method, apparatuses, and non-transitory computer-readable medium described herein, the SNR threshold may be based on a phase noise of the wireless channel, a delay spread of the wireless channel, a doppler spread of the wireless channel, or any combination thereof.

In some examples of the method, apparatuses, and non-transitory computer-readable medium described herein, transmitting the CSI report may include operations, features, means, or instructions for transmitting a request of the set of one or more waveform parameters for the MLC APSK modulated waveform.

In some examples of the method, apparatuses, and non-transitory computer-readable medium described herein, the MLC APSK modulated waveform may be a single carrier MLC APSK waveform.

Some examples of the method, apparatuses, and non-transitory computer-readable medium described herein may further include operations, features, means, or instructions for transmitting an indication of a UE capability for communicating using the MLC APSK modulated waveform, where the indication of the set of one or more waveform parameters may be received based on the indication of the UE capability.

In some examples of the method, apparatuses, and non-transitory computer-readable medium described herein, communicating with the base station using the MLC APSK modulated waveform may include operations, features, means, or instructions for transmitting a signal having the MLC APSK modulated waveform to the base station based on the set of one or more waveform parameters and receiving a signal having the MLC APSK modulated waveform from the base station based on the set of one or more waveform parameters.

One innovative aspect of the subject matter described in this disclosure can be implemented in a method for wireless communications at a base station. The method may include receiving, from a UE, a CSI report indicating a MLC APSK modulated waveform, transmitting, to the UE, an indication of a set of one or more waveform parameters for the MLC APSK modulated waveform based on the CSI report, and communicating with the UE using the MLC APSK modulated waveform based on the set of one or more waveform parameters.

Another innovative aspect of the subject matter described in this disclosure can be implemented in an apparatus for wireless communications at a base station. The apparatus may include a processor, memory coupled with the processor, and instructions stored in the memory. The instructions may be executable by the processor to cause the apparatus to receive, from a UE, a CSI report indicating a MLC APSK modulated waveform, transmit, to the UE, an indication of a set of one or more waveform parameters for the MLC APSK modulated waveform based on the CSI report, and communicate with the UE using the MLC APSK modulated waveform based on the set of one or more waveform parameters.

Another innovative aspect of the subject matter described in this disclosure can be implemented in an apparatus for wireless communications at a base station. The apparatus may include means for receiving, from a UE, a CSI report indicating a MLC APSK modulated waveform, means for transmitting, to the UE, an indication of a set of one or more waveform parameters for the MLC APSK modulated waveform based on the CSI report, and means for communicating with the UE using the MLC APSK modulated waveform based on the set of one or more waveform parameters.

Another innovative aspect of the subject matter described in this disclosure can be implemented in a non-transitory computer-readable medium storing code for wireless communications at a base station. The code may include instructions executable by a processor to receive, from a UE, a CSI report indicating a MLC APSK modulated waveform, transmit, to the UE, an indication of a set of one or more waveform parameters for the MLC APSK modulated waveform based on the CSI report, and communicate with the UE using the MLC APSK modulated waveform based on the set of one or more waveform parameters.

In some examples of the method, apparatuses, and non-transitory computer-readable medium described herein, transmitting the indication of the set of one or more waveform parameters may include operations, features, means, or instructions for transmitting an indication of an MCS table and an index to the MCS table corresponding to the set of one or more waveform parameters.

In some examples of the method, apparatuses, and non-transitory computer-readable medium described herein, transmitting the indication of the set of one or more waveform parameters may include operations, features, means, or instructions for transmitting an indication of a configuration for a MLC APSK constellation associated with the MLC APSK modulated waveform, where the configuration for the MLC APSK constellation includes a number of rings, a number of constellation points per ring, a radius for each ring of the number of rings, a radii ratio, a signal to noise ratio threshold, a power amplifier backoff, a dominant impairment threshold, or any combination thereof.

In some examples of the method, apparatuses, and non-transitory computer-readable medium described herein, transmitting the indication of the set of one or more waveform parameters may include operations, features, means, or instructions for transmitting an indication that the MLC APSK modulated waveform may be configured for MSD or PD.

In some examples of the method, apparatuses, and non-transitory computer-readable medium described herein, transmitting the indication of the set of one or more waveform parameters may include operations, features, means, or instructions for transmitting an indication of an MCS table of a set of multiple MCS tables, where the MCS table includes a set of multiple sets of one or more waveform parameters including the set of one or more waveform parameters.

In some examples of the method, apparatuses, and non-transitory computer-readable medium described herein, transmitting the indication of the set of one or more waveform parameters may include operations, features, means, or instructions for transmitting the indication of the set of one or more waveform parameters via a DCI message, RRC signaling, a MAC-CE, or any combination thereof.

Some examples of the method, apparatuses, and non-transitory computer-readable medium described herein may further include operations, features, means, or instructions for determining that an SNR of a wireless channel between the UE and the base station satisfies an SNR threshold, where the communicating with the UE using the MLC APSK modulated waveform may be based on satisfaction of the SNR threshold.

In some examples of the method, apparatuses, and non-transitory computer-readable medium described herein, the SNR threshold may be based on a phase noise of the wireless channel, a delay spread of the wireless channel, a doppler spread of the wireless channel, or any combination thereof.

In some examples of the method, apparatuses, and non-transitory computer-readable medium described herein, receiving the CSI report may include operations, features, means, or instructions for receiving a request of the set of one or more waveform parameters for the MLC APSK modulated waveform.

In some examples of the method, apparatuses, and non-transitory computer-readable medium described herein, the MLC APSK modulated waveform may be a single-carrier MLC APSK modulated waveform.

Some examples of the method, apparatuses, and non-transitory computer-readable medium described herein may further include operations, features, means, or instructions for receiving an indication of a UE capability for communicating using the MLC APSK modulated waveform, where the indication of the set of one or more waveform parameters may be transmitted based on the indication of the UE capability.

In some examples of the method, apparatuses, and non-transitory computer-readable medium described herein, communicating with the UE using the MLC APSK modulated waveform may include operations, features, means, or instructions for receiving a signal having the MLC APSK modulated waveform from the UE based on the set of one or more waveform parameters and transmitting a signal with the MLC APSK modulated waveform to the UE based on the set of one or more waveform parameters.

DETAILED DESCRIPTION

Figure 1:
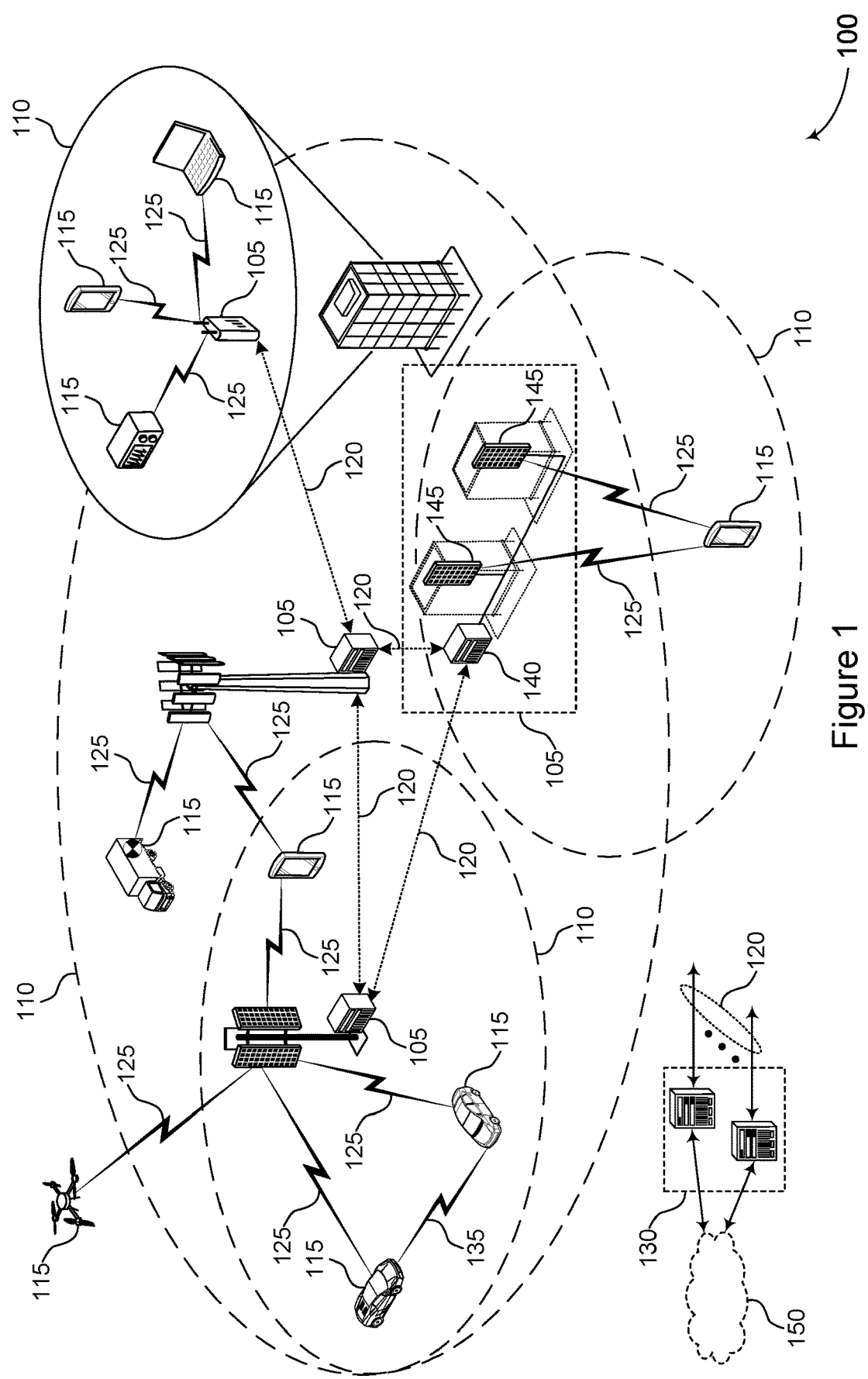
FIGS. 1 and 2 illustrate examples of wireless communications systems that support single carrier multi-level coding (MLC) amplitude phase shift keying (APSK) waveforms in accordance with aspects of the present disclosure.

In some wireless communications systems, devices may communicate using communication links, which may be subject to channel impairments. For example, a user equipment (UE) and a base station may communicate with one another using a communication link on a relatively high frequency radio frequency spectrum band. The UE and base station may experience channel impairments, such as phase noise or non-linear signal behavior (for example, due to a relatively high peak to average power ratio (PAPR)), among others. For example, the phase noise may be a result of the local oscillator of a transmitting device causing anomalous variations in phase (for example, phase jittering), which may distort a received signal at a receiving device. In some cases, distortion from the phase noise may be more severe at relatively higher carrier frequencies, such that phase noise may become a dominant channel impairment (for example, an impairment having more influence over channel conditions or causing greater distortion), and devices receiving signaling with relatively higher phase noise may experience degraded signal quality when decoding signaling. Some wireless communications systems may use bit-interleaved coded modulation (BICM) for channel coding. For BICM encoding, information bits may be encoded before being grouped into symbols and mapped to constellation points, which can provide equal error protection across all bits in each symbol. Different bits in a symbol, however, may experience different error probability. For example, a most-significant bit (MSB) in a symbol may have a highest error probability compared to another bit in the symbol, such as in the case of a dominant channel impairment like phase noise. And equal error protection from BICM and other techniques may be deficient, as some bits in a symbol can be more susceptible to conditions causing error.

Various aspects generally relate to modulation and coding schemes (MCSs) for wireless communications, and more specifically to implementing multi-level coding (MLC) with amplitude phase shift keying (APSK) modulation to configure different (for example, unequal) error protection for different bits in a symbol. In some examples, a device configured to use MLC may support unequal error protection by dividing a set of bits into two or more subsets, in which each subset may correspond to a different code rate. To support MLC APSK modulation, the UE may transmit a channel state information (CSI) report to a base station, which may include an indication of an MCS and a waveform (for example, a recommended MCS and a recommended waveform). For example, the base station may select an MCS and a waveform adaptively with UE assistance based on the UE recommendation within the measurement report. In some examples, the network may indicate a selected MCS to the UE. For example, the network may indicate an MCS table and an index to the MCS table to indicate the MCS. In some implementations, indices to the MCS tables may correspond to variations of APSK constellations, such as APSK constellations with different numbers of rings, constellation points associated with each ring, or ring radii ratios, among other examples. In some examples, an MLC APSK constellation configuration may be based on a signal-to-noise ratio (SNR) threshold, a power amplifier backoff, or other channel scenario metric.

Particular aspects of the subject matter described in this disclosure may be implemented to realize one or more of the following potential advantages. The techniques employed by the UE and the base station may provide benefits and enhancements to the operation of the UE and the base station, including higher spectral efficiency and communication reliability. For example, operations performed by the UE may provide improvements to the selection of suitable MCSs (for example, MCSs associated with mitigating phase noise or reducing PAPR) by providing the base station with a measurement report or CSI report including an MCS recommendation. In some implementations, the operations performed by the base station to select an MCS may improve signaling throughput by performing power backoff procedures associated with APSK modulation or selecting an MCS corresponding to a dominant channel impairment, among other examples. In some implementations, operations performed by the UE and the base station may support improvements to phase noise resiliency, non-linearity resiliency, higher energy efficiency, or widespread coverage, among other improvements.

Aspects of the disclosure are initially described in the context of wireless communications systems. Aspects of the disclosure are then described in the context of constellation diagrams and a process flow. Aspects of the disclosure are further illustrated by and described with reference to apparatus diagrams, system diagrams, and flowcharts that relate to single carrier MLC APSK waveform.

FIG. 1 illustrates an example of a wireless communications system 100 that supports a single carrier MLC APSK waveform in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, in which the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode in which initial acquisition and connection may be conducted by the UEs 115 via the carrier, or the carrier may be operated in a non-standalone mode in which a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, in which the symbol period and subcarrier spacing are inversely related. The number of bits carried by each resource element may depend on the modulation scheme (for example, the order of the modulation scheme, the coding rate of the modulation scheme, or both). The more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, in which $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable and may provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. If operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with a component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

In some wireless communications systems, devices may communicate with communication links which may be subject to one or more channel impairments. For example, a UE 115 and a base station 105 may communicate with one another using high frequency band communication links, in which the UE 115 and the base station 105 may experience channel distortions, such as phase noise, non-linear signal behavior (for example, due to a relatively high PAPR, among other channel impairments. In some examples, devices may implement MLC with APSK modulation to configure unequal error protection for bits in a symbol, providing different protection for different bits transmitted using a single carrier MLC APSK waveform to mitigate such channel impairments. In some examples, a device configured to use MLC may support unequal error protection by dividing a set of bits into two or more subsets, and each subset may correspond to a different coding level. For example, each subset may be encoded according to a different coding level or code rate.

To support MLC APSK modulation, the UE 115 may transmit a CSI report to a base station 105, in some examples with a recommendation or a request for an MCS and waveform. The base station 105 may select an MCS and waveform adaptively with UE 115 assistance in accordance with the UE recommendation within the measurement report. In some examples, the base station 105 may indicate a selected MCS to the UE 115, configuring the UE 115 to communicate with MLC APSK modulated waveforms.

Figure 2:
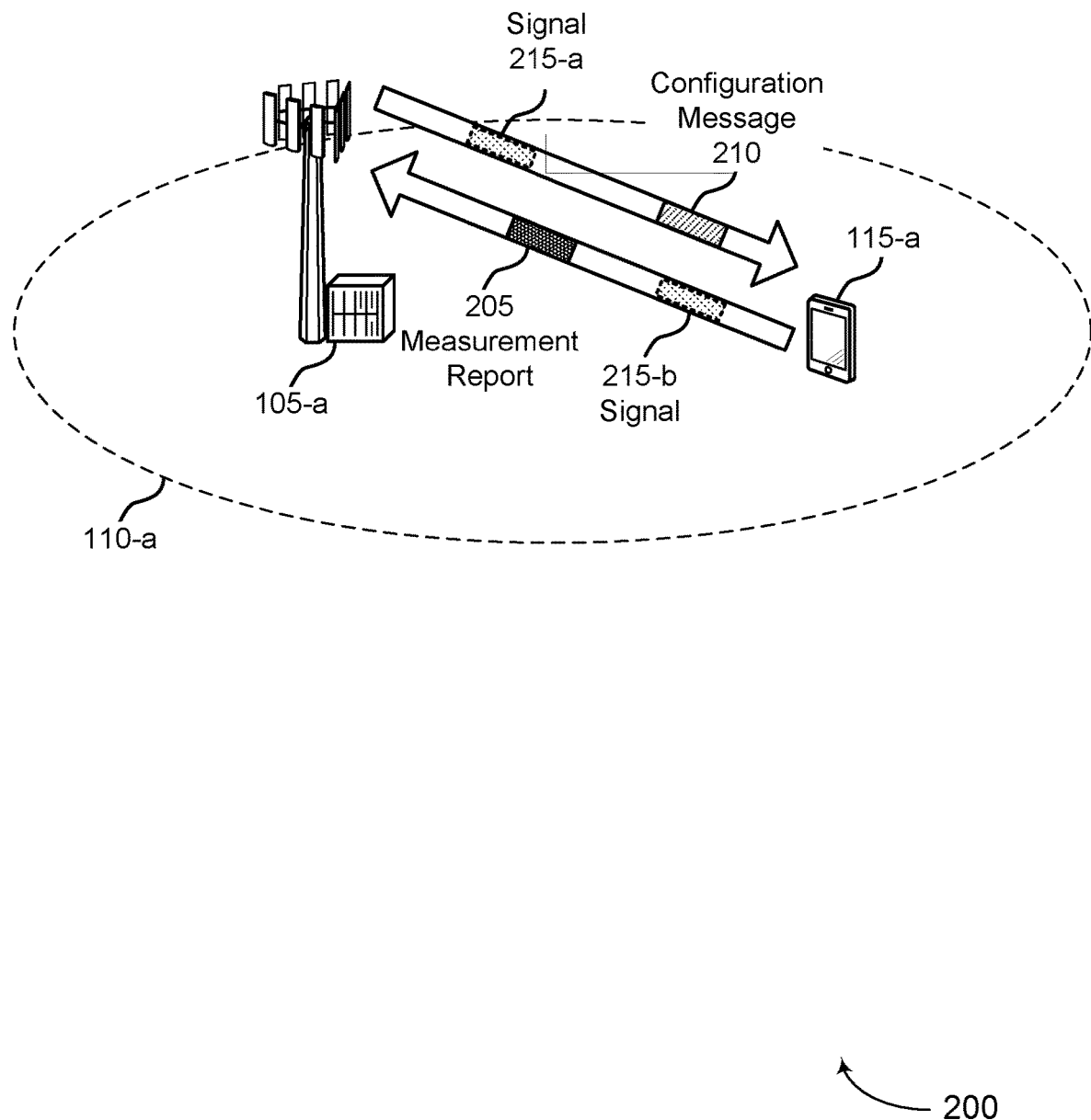

FIG. 2 illustrates an example of a wireless communications system 200 that supports a single carrier MLC APSK waveform in accordance with aspects of the present disclosure. In some examples, the wireless communications system 200 may implement aspects of the wireless communications system 100. For example, the wireless communications system 200 may include a UE 115-a and a base station 105-a which may be examples of corresponding devices as described with reference to FIG. 1. In some examples, the UE 115-a may be located in a coverage area 110-a covered by, or otherwise corresponding to, the base station 105-a such that the UE 115-a may transmit uplink information to the base station 105-a and receive downlink information from the base station 105-a. In some implementations, the UE 115-a and the base station 105-a may support signaling to determine a transmission scheme for single carrier MLC APSK waveforms in accordance with one or more channel conditions.

In some examples, the UE 115-a and the base station 105-a may communicate with one another in an environment subject to channel impairments such as phase noise, non-linearity (for example, due to relatively high PAPR), among other examples. In some examples, the UE 115-a and the base station 105-a may communicate in an environment with relatively high phase noise (for example, compared to an environment with low signaling noise). Phase noise may be multiplicative in the time domain, and a local oscillator of a transmit chain at a transmitting device or a receive chain at a receiving device, or both, may generate the phase noise. For example, the UE 115-a may transmit a signal to the base station 105-a, in which, due to anomalous phase variations (for example, phase jittering) in the local oscillator at the UE 115-a or the base station 105-a, or both, the signal may be distorted in the time domain.

Some implementations may be subject to relatively impactful channel impairments, such as non-terrestrial network (NTN) communications, SubTHz communications, and any other communication using relatively high carrier frequencies, relatively high transmission power, among other examples. For example, in an NTN network, satellite communications may be configured to support long distance transmissions, in which both an uplink device and a downlink device may use high transmission power to transmit signals which may, in some examples, result in high PAPR. In such an example, communication devices may be configured with limited power resources, such that power amplifier efficiency may be paramount. In some other examples, such as communications using SubTHz frequencies, communication devices may be configured to transmit signals using high transmission power, for example, due to link decay. Additionally, in either example, phase noise may increase with increasing carrier frequency. For example, in a scenario in which the UE 115-*a* and the base station 105-*a* communicate with one another using high frequency bands such (for example, within, or proximal to FR2, FR3, FR4, FR5, SubTHz bands, bands used for NTNs), the communications between the UE 115-*a* and the base station 105-*a* may be subject to relatively high phase noise, as compared to phase noise corresponding to relatively low frequency band communications.

In some examples, the UE 115-*a* and the base station 105-*a* may communicate using a non-linear region of a power amplifier. For example, the base station 105-*a* may transmit a signal to the UE 115-*a* using a transmit power corresponding to a high PAPR, in some examples, using a non-linear region of a power amplifier to transmit the signal. In such cases, the base station 105-*a* may perform a power backoff (for example, reduce transmission power) to avoid error vector magnitude (EVM) deterioration (for example, maintain a performance metric at the transmitter) and mitigate spectral re-growth (for example, decrease intra-band and outer-band transmissions).

In some examples, the UE 115-*a* and the base station 105-*a* may communicate using modulation schemes which may exhibit relatively low PAPR characteristics (for example, as compared to a PAPR corresponding to a transmission from a power amplifier operating non-linearly). For example, the UE 115-*a* and the base station 105-*a* may communicate using single carrier waveforms. Single carrier waveform communications may exhibit low PAPR characteristics, resulting in a higher power amplifier efficiency and extended battery life for the base station 105-*a*, the UE 115-*a*, or both. Additionally, single carrier waveform communications may result in high data rates (for example, in high frequency ranges) due to massive spectrum availability. Additionally, or alternatively, the UE 115-*a* and the base station 105-*a* may communicate using an APSK modulation scheme, using a number of symbols to convey information to another device. These symbols may be mapped to a discrete set of amplitude and phase values (for example, constellation points) on a constellation distribution, which may also be referred to as a constellation diagram. For example, the base station 105-*a* may transmit a signal to the UE 115-*a* using a 16APSK scheme, in which the base station 105-*a* may map every four bits of data in the signal to a corresponding constellation point in an associated 16APSK constellation diagram.

In some examples, APSK modulation may support PAPR reduction as the UE 115-*a* and the base station 105-*a* may determine to communicate using a constellation diagram associated with power backoff. For example, a first set of constellation points of a constellation diagram may be associated with a first transmission amplitude and a second set of constellation points of the constellation diagram may be associated with a second transmission amplitude, the second transmission amplitude being greater than the first transmission amplitude. To reduce PAPR, the base station 105-*a* and the UE 115-*a* may determine to communicate using the first set of constellation points, or any other constellation point associated with a relatively low PAPR (for example, as compared to a PAPR associated with non-linear power amplifier behavior). While APSK modulation supports PAPR reduction, constellation parameters (for example, magnitude ratios, constellation diagram type) may be selected to maintain, or mitigate a decrease in constellation efficiency, as compared to a constellation efficiency of another modulation scheme (for example, quadrature amplitude modulation (QAM)).

In some examples, the UE 115-*a* and the base station 105-*a* may select a modulation type and a coding scheme to interleave bits of a constellation symbol such that the bits of a constellation symbol may include a combination of amplitude modulated information and phase modulated information. Some wireless communications systems may use BICM for channel coding, providing equal error protection across all bits in a symbol. For example, if using BICM, a device may interleave and encode information bits (for example, associated with modulated amplitude or modulated phase) before being grouped into symbols and mapped to constellation points, resulting in an equal error protection in all bits of a symbol. However, different bits in a symbol may experience different error probability. For example, an MSB in a symbol may have a highest error probability (for example, compared to the other bits of the symbol), such as in the case of a dominant channel impairment like phase noise. As such, equal error protection from BICM and other techniques may be deficient, as some bits in a symbol are more susceptible for error.

In some examples, the UE 115-*a* and the base station 105-*a* may select a modulation type and a coding scheme to separate amplitude and phase carrying bits. For example, the UE 115-*a* and the base station 105-*a* may select a modulation type and a coding scheme to separate bits of a constellation symbol such that a first set of bits may correspond to phase modulation and a second set of bits may correspond to amplitude modulation. In some examples, the UE 115-*a* and the base station 105-*a* may use MLC for channel coding, providing unequal error protection across the bits of a symbol. In some examples, a device configured to use MLC may subdivide a binary representation, or labelling bits, of each symbol (for example, of a constellation diagram) and may separate the binary representation into subsets of bits. Each subset may correspond to a respective coding level having different codes (for example, MCS values) and the summation of the bits in each subset may be equal to the number of bits in the original binary representation. As such, MLC supports encoding distinct bits, or groups of bits, for constellation symbols using respective codes, providing un-equal (for example, specific, different) protection for such bits. There may be numerous methods for labeling, subdividing, encoding, and decoding in accordance with MLC. Each method may be selected for a respective communication environment in accordance with factors such as a channel type, an SNR (for example, a working point SNR), any channel impairment (for example, non-linear power amplifier performance, phase noise), or a combination thereof. For example, an MSB in a symbol may have a highest error probability, such as in the case of a channel impairment like phase noise. As such, MLC may support a subdivision of bits for direct treatment of the MSB, in which the MSB may be transmitted using a lower coding rate, as compared to the rest of the bits of the symbol.

As described herein, wireless communications in higher bands (for example, FR2, FR3, FR4, FR5, bands associated with NTNs), and higher MCSs, among other examples, may be particularly sensitive to phase noise, high PAPR, among other examples. For example, wireless communications in higher bands, and higher MCSs, among other examples, may be particularly sensitive to phase noise that degrades communication performance. That is, phase noise introduced by oscillators at the base station 105-a, the UE 115-a, or both, may have a greater impact on wireless communications in higher bands or using higher MCSs, than wireless communications in lower bands (for example, FR1, among other examples). As such, phase noise may be a dominant channel impairment on communication performance in higher bands or higher MCSs. In some examples, high power channel transmissions, for example, associated with a non-linear region of a power amplifier and a high PAPR, may be a dominant channel impairment on communication performance.

Devices may use MLC in conjunction with APSK modulation to mitigate phase noise, lower PAPR, compensate non-linear device behavior (for example, using amplitude and phase correction for each constellation ring) among other channel impairments. In the example of the wireless communications system 200, the UE 115-a and the base station 105-a may use signaling to determine an APSK modulation scheme using MLC such that a first set of bits of the binary representation for each constellation point of the APSK modulation scheme may correspond to amplitude modulation and a second set of bits may correspond to phase modulation.

For example, the UE 115-a may transmit a CSI report 205 (for example, a CSI report) to the base station 105-a including an indication of an MCS (for example, a recommended APSK scheme, in some examples, with an MLC indication). The base station 105-a may receive the CSI report 205 from the UE 115-a and the base station 105-a may select an MCS in accordance with the indication of the MCS from the CSI report 205, measurements made at the base station 105-a (for example, measurements of sounding reference signals (SRSs)), or a combination thereof. The base station 105-a may transmit a configuration message 210 to the UE 115-a indicating the MCS selected by the base station 105-a. As such, the base station 105-a and the UE 115-a may communicate according to the MCS selected by the base station 105-a. For example, the base station 105-a may transmit a signal 215-a using an MLC APSK modulated waveform associated with the MCS selected at the base station 105-a. Additionally, or alternatively, the UE 115-a may transmit a signal 215-b using an MLC APSK modulated waveform associated with the MCS scheme selected at the base station 105-a.

Figure 3:
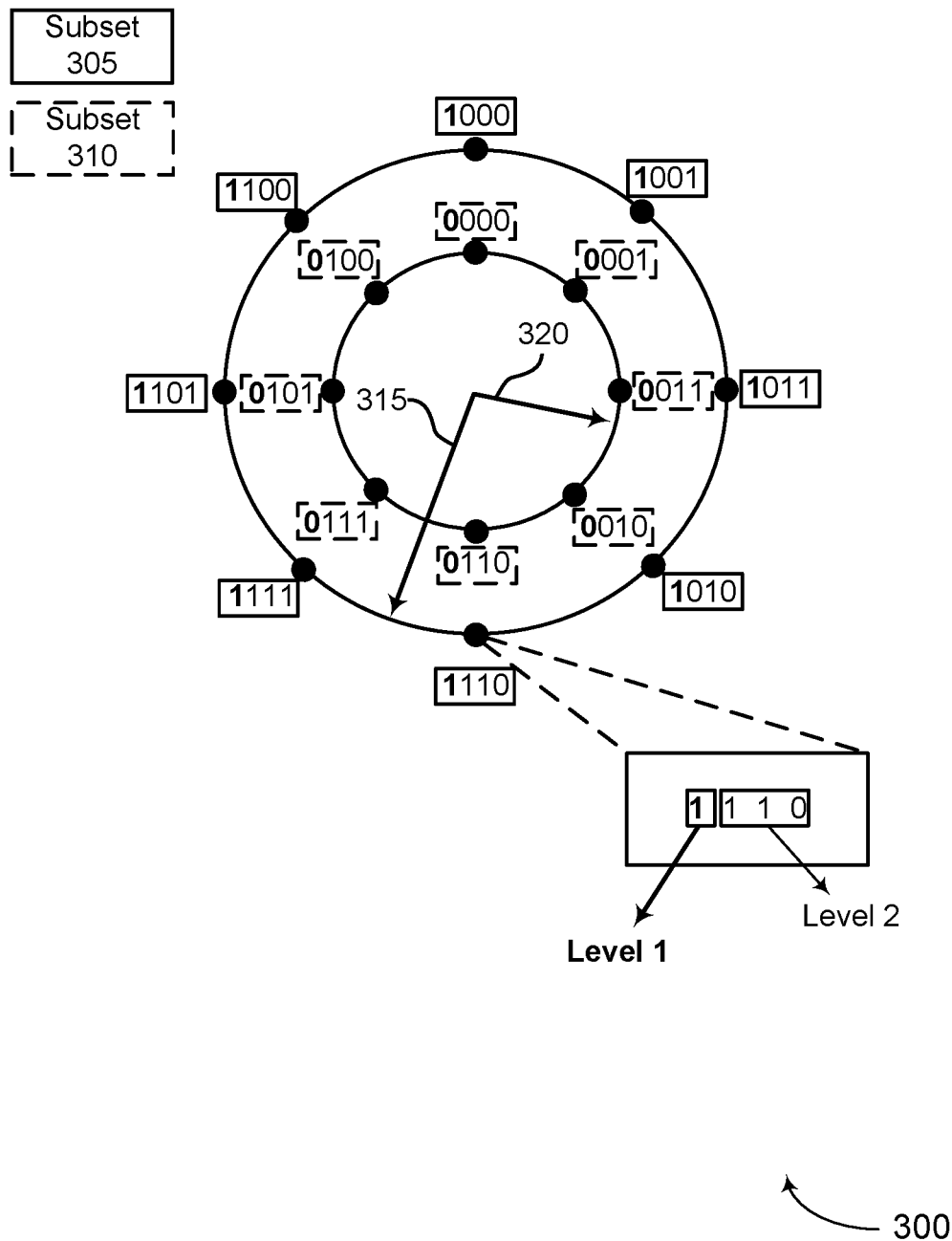
FIGS. 3 and 4 illustrate examples of constellation diagrams that support single carrier MLC APSK waveforms in accordance with aspects of the present disclosure.

FIG. 3 illustrates an example of a constellation diagram 300 that supports a single carrier MLC APSK waveform in accordance with aspects of the present disclosure. In some examples, wireless communications systems such as the wireless communications system 100 and the wireless communications system 200 as described with reference to FIGS. 1 and 2, respectively, may use the constellation diagram 300. For example, a UE 115, base station 105, or any other wireless device may use the constellation diagram 300 to transmit single carrier MLC APSK modulated waveforms.

In some examples, the constellation diagram 300 may be associated with MLC parallel-independence decoding (PID). For example, the constellation diagram 300 may include multiple constellation symbols (for example, represented as dots labelled with four-bit binary representations), in which the constellation symbols may be divided into two coding layers, Level 1 and Level 2. The MSB of the binary representation for each constellation symbol may be associated with Level 1 and the remaining three bits for each constellation symbol may be associated with Level 2. A receiving device (for example, a UE, a base station, a satellite) configured to perform MLC PID may receive an MLC coded waveform (for example, a single carrier MLC APSK modulated waveform) encoded with a series of information bits associated with the constellation symbols and such bits can be distinguished into Level 1 and Level 2. Accordingly, the receiving device may decode each level independently without referencing or applying information obtained from decoding another level. For example, the receiving device may receive four bits of information associated with the constellation symbol 0011. The receiving device may decode the first bit (for example, 0) independently from the remaining three bits (for example, 011).

In some implementations, the different coding levels may be associated with different subsets, such as a subset 305 and a subset 310, in which each subset may be decoded separately. For example, in the constellation diagram 300, the constellation symbols associated with Level 1 may be included in the subset 305 and the constellation symbols associated with Level 2 may be included in the subset 310. In some examples, the different subsets may be associated with different APSK rings, and likewise, different amplitudes. That is, the subset 305 and the subset 310, may be associated with the outer APSK ring (for example, associated with a radius 315) and the inner APSK ring (for example, associated with a radius 320), respectively. As such, coding data using the subset 305 and switching to coding data using the subset 310 may correspond to coding data with, or shifting the value of, the amplitude of a waveform. In other words, flipping the bit of the MSB may correspond to a change in the amplitude of a waveform. As such, the labelling configuration of the constellation diagram 300 may support distinguishing between APSK rings by the MSB (for example, amplitude and phase information and dependencies may correspond to the different coding levels). Additionally, or alternatively, Level 1 may be coded with a relatively high coding rate, for example, in the case that high PAPR may not be a dominant channel impairment and it may be relatively easier to distinguish waveform amplitude, and thus which ring a constellation point may belong to, as compared to distinguishing waveform phase, and thus which angle a constellation point correspond to.

The constellation diagram 300 may be associated with a communications system that may be subject to angular deviation, for example, caused by a dominant channel impairment like phase noise. For example, the SNR of a communications channel may satisfy an SNR threshold, where past the SNR threshold, phase noise may be associated with a relatively large amount of decoding errors (for example, block error rates, bit error rates) as compared to waveform amplitude impairment, such as PAPR. In such a phase noise dominant scenario (for example, a scenario with a relatively flat and static channel, such as an additive white gaussian noise (AWGN)-like channel), the three least significant bits (LSBs), such as those associated with Level 2, may be coded with a lower coding rate, increasing protection against phase noise impairment.

In some implementations, the constellation diagram 300 may support APSK configurations in which a number of constellation points on each ring may be equal. For example, in the constellation diagram 300, the number of constellation points on each ring may be eight. Such a configuration may be applicable to more than eight constellation points on each ring, for example, in 64APSK, the APSK configuration may have four rings, in which each ring may contain 16 constellation points. The constellation diagram 300 may be configurable to support more MLC levels, such as three MLC levels, four MLC levels, and so on, such that each level may correspond to a different waveform amplitude.

In a phase noise limited channel, using MLC APSK modulated waveforms according to the constellation diagram 300 may provide for lowered PAPR and increased phase noise resiliency. Increased phase noise resiliency can be achieved by configuring devices to use the constellation diagram 300, for example, if using 2 MLC levels in which Level 1 includes amplitude related bits and Level 2 includes phase related bits, more protection (for example, manifested by a lower code rate) can be allocated to Level 2, providing a greater protection against phase noise. That is, coupling MLC with an APSK constellation diagram along with an appropriate set partitioning may reduce PAPR and increase phase noise resiliency. In addition, the constellation diagram 300 may provide for increasing PAPR performance in accordance with using APSK modulation.

Figure 4:
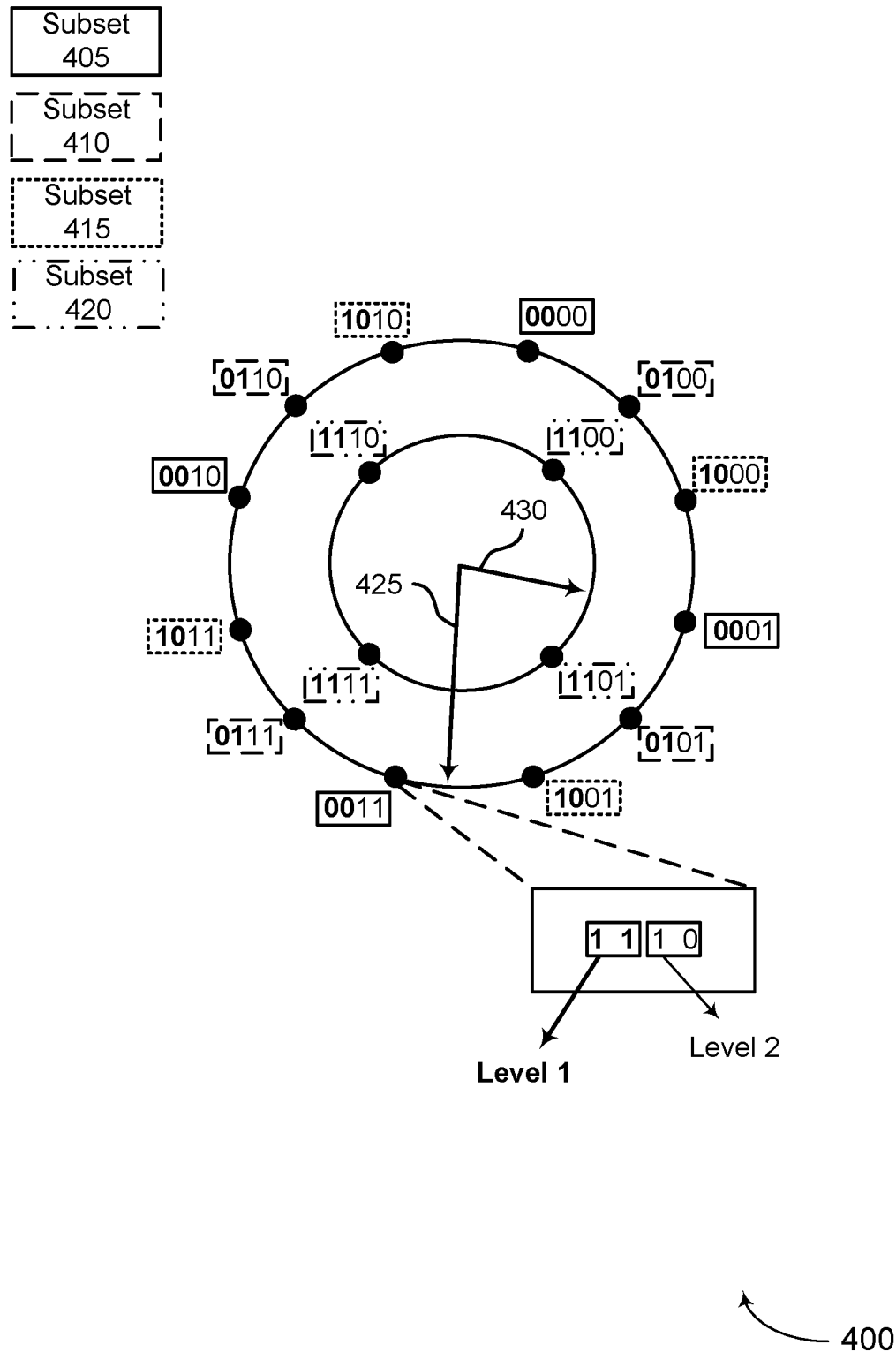

FIG. 4 illustrates an example of a constellation diagram 400 that supports a single carrier MLC APSK waveform in accordance with aspects of the present disclosure. In some examples, wireless communications systems such as the wireless communications system 100 and the wireless communications system 200 as described with reference to FIGS. 1 and 2, respectively, may use the constellation diagram 400. For example, a UE 115, a base station 105, or any other wireless device may use the constellation diagram 400 to transmit single carrier MLC APSK modulated waveforms.

In some examples, the constellation diagram 400 may be associated with MLC multistage decoding (MSD). For example, the constellation diagram 400 may include multiple constellation symbols (for example, represented as dots labelled with four-bit binary representations), in which the constellation symbols may be divided into two coding layers, Level 1 and Level 2. In the example of the constellation diagram 400, the first two MSBs of the binary representation for each constellation symbol may be associated with Level 1 and the two LSBs for each constellation symbol may be associated with Level 2. A receiving device (for example, a UE, a base station, a satellite) configured to perform MLC MSD may receive an MLC coded waveform (for example, a single carrier MLC APSK modulated waveform) encoded with a series of information bits associated with the constellation symbols, and such bits can be distinguished into Level 1 and Level 2. Accordingly, the receiving device may decode a first level (for example, Level 1) and based on knowledge obtained from decoding the first level, the receiving device may decode a second level (for example, Level 2). That is, the receiving device may include circuitry, or any means of decoding data, which may be configured to leverage decoding data from the first level to decode the second level. For example, the receiving device may receive information bits 1110, in which Level 1 of the information bits may be 11 and Level 2 of the information bits may be 10. As such, the receiving device may decode Level 1, in which the decoding information from Level 1 may point to, or may otherwise aid, the decoding of Level 2.

In some implementations, the different coding levels may be associated with different subsets, such as a subset 405, a subset 410, a subset 415, and a subset 420, in which each subset may be associated with a respective Level 1 binary representation. For example, in the constellation diagram 400, the binary representations associated with Level 1 may be divided into the subset 405 having labelling 00, the subset 410 having labelling 01, the subset 415 having labelling 10, and the subset 420 having labelling 11. Such labelling, consisting of two levels and four subsets, may support MSD such that decoding information from the Level 1 of a set of information bits may point to a smaller group of constellation points associated with Level 2 of the set of information bits. That is, in the constellation diagram 400, decoding the first two bits associated with a constellation symbol may point to a subset, refining the number of constellation points a decoding device may distinguish between in the decoding of Level 2. For example, a receiving device may receive a waveform modulated using the constellation diagram 400, decode Level 1, and may determine the bits to be 11. As such, the receiving device may determine that the information of the waveform may be associated with the subset 420. Accordingly, the receiving device may decode Level 2 and retrieve the information from the modulated waveform.

In some examples, Level 2 may be associated with phase behavior such that using the constellation diagram 400 may mitigate signal deviations, for example, caused by a dominant channel impairment like phase noise. In the example of the constellation diagram 400, Level 1 may be coded with a lower coding rate compared to Level 2. That is, Level 1 may be associated with refining the set of distinguishable constellation points to a specific subset, and as such, may be coded with a lower rate to provide more code protection to such assistance information. Additionally, or alternatively, Level 1 bits on the outer ring, associated with radius 425, may experience more distortion from phase noise (for example, due to a smaller minimum angular distance brought on by an unequal distribution of constellation points between APSK rings) and may be coded with a lower coding rate compared to Level 2 bits.

In some implementations, the radii of the APSK rings may be associated with PAPR performance, such that modulating the radii may increase (or decrease) PAPR performance. For example, decreasing a ratio of a radius 425 and a radius 430 may be associated with lower PAPR performance, as decreasing the ratio may be associated with gradually making the rings closer. As an illustrative example, the PAPR performance associated with constellation diagram 400 according to Equation (1).

$$PAPR = (n_1 + n_2) * \left( \left( \frac{r_2}{r_1} \right)^{-2} n_1 + n_2 \right)^{-1} = 16 * \frac{1}{(4 * R^{-2} + 12)} \quad (1)$$

In Equation (1), $n_1$ and $n_2$ may be the number of constellation points on the inner APSK ring and the outer APSK ring, respectively. Further, $r_1$ and $r_2$ may be the radius 430 and the radius 425, respectively. Additionally, R may be the ratio of $r_2$ and $r_1$ (for example, $$R = \frac{r_2}{r_1}).$$

Combined in me manner illustrated in Equation (1), these factors may result in PAPR, which may represent the PAPR of a signal transmitted using the constellation diagram 400.

To equalize decision error between subsets for the constellation diagram 400, an appropriate value of R may be chosen. For example, to further distinguish between the subset 410 and the subset 420 which may be associated with substantially equal angular positions in the constellation diagram 400, a larger value of R may be chosen. In some examples, decreasing the value of R may be associated with a difficulty in distinguishing states, a higher PAPR, and the like. For example, for a given SNR, decreasing the value of R may correspond to increasing difficulty in distinguishing states associated with each ring. In such an example, received signals associated with each ring may overlap more as the radii of the APSK rings become closer.

Increased phase noise resiliency can be achieved by configuring devices to use the constellation diagram 400 (for example, MLC APSK). For example, using 2 MLC levels in which Level 1 points to Level 2, including phase related bits, may result in greater protection against phase noise. In addition, the constellation diagram 400 may provide for increasing PAPR performance in accordance with using APSK modulation.

Figure 5:
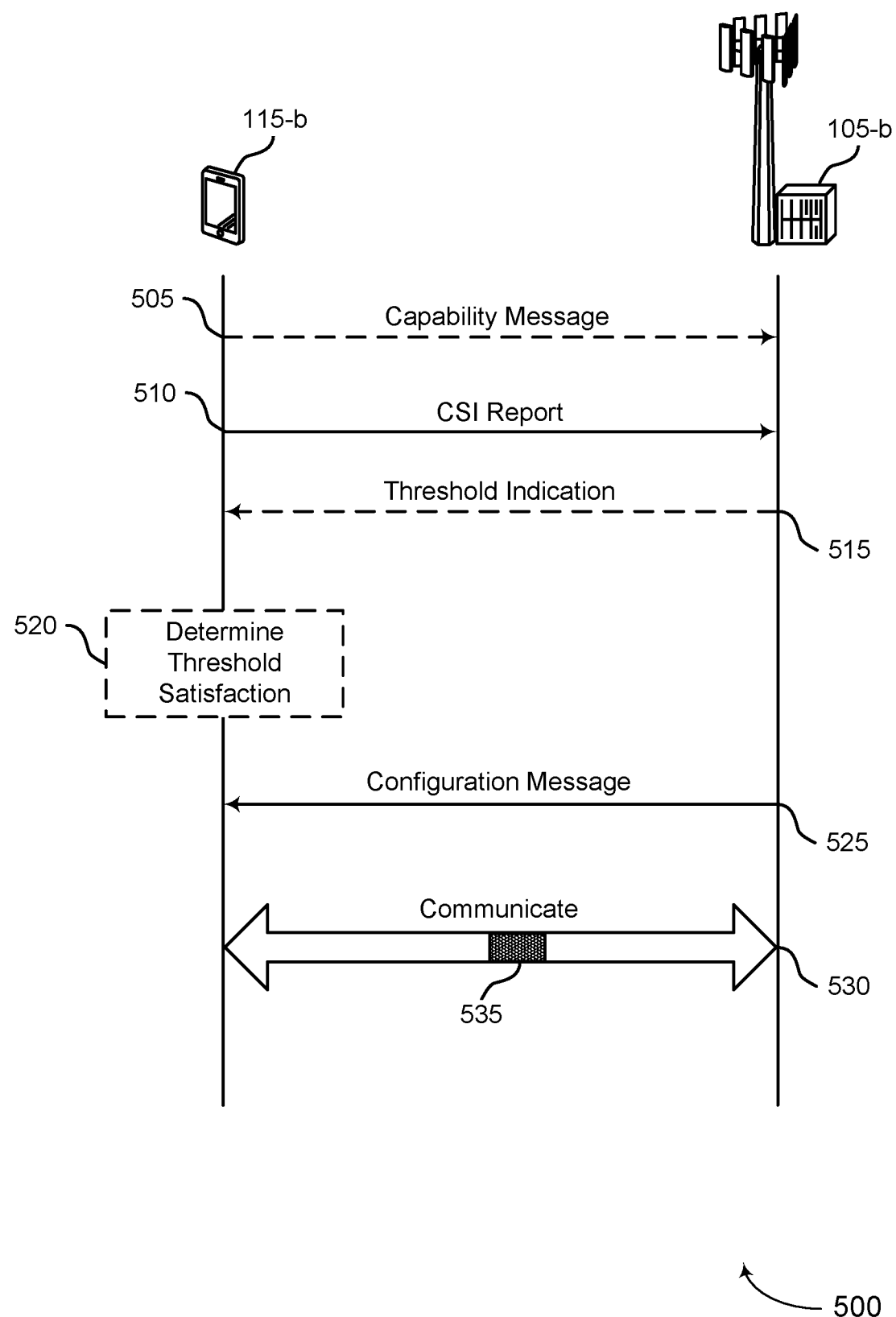
FIG. 5 illustrates an example of a process flow that supports a single carrier MLC APSK waveform in accordance with aspects of the present disclosure.

FIG. 5 illustrates an example of a process flow 500 that supports a single carrier MLC APSK waveform in accordance with aspects of the present disclosure. In some implementations, the process flow 500 may implement aspects of a wireless communications system 100 or 200, as described with reference to FIGS. 1 and 2. The process flow 500 may include a UE 115-b and a base station 105-b, which may be examples of the corresponding devices described with reference to FIGS. 1 and 2. The UE 115-b and the base station 105-b may communicate using single carrier MLC APSK modulated waveforms, for example using the constellation diagram 300, the constellation diagram 400, as described with reference to FIGS. 3 and 4, respectively, or any other constellation diagram associated with single carrier MLC APSK modulation. Alternative aspects of the following may be implemented, in which some steps are performed in a different order than described or are not performed at all. In some implementations, steps may include additional features not mentioned below, or further steps may be added.

In some examples, at 505, the UE 115-b may transmit a capability message to the base station 105-b. For example, the UE 115-b may transmit an indication of a UE capability for communicating using MLC APSK modulated waveforms. In some examples, the UE 115-b may transmit the indication, informing the base station 105-b that the UE 115-b is capable of using MLC APSK modulated waveforms.

At 510, the UE 115-b may transmit a CSI report to the base station 105-b, in which the CSI report may correspond to an MLC APSK modulated waveform. For example, the UE 115-b may transmit the CSI report to the base station 105-b including a recommendation or request of a set of waveform parameters such as an MCS index, an MLC coding scheme, an APSK constellation diagram, or any other waveform parameter associated with MLC APSK modulated waveforms.

In some examples, at 515, the base station 105-b may transmit and the UE 115-b may receive an indication of a threshold. For example, the base station 105-b may indicate an SNR threshold, a dominant channel impairment threshold, among other examples to the UE 115-b. In some implementations, the SNR threshold may be based on a phase noise mask, a single carrier waveform symbol time, a power amplifier non-linear region, a power backoff, a channel delay spread, a channel doppler spread, among other examples. The base station 105-b may transmit the threshold as, or within, a downlink control information (DCI) message, radio resource control (RRC) signaling, a medium access control (MAC) control element (CE) message, or a combination thereof.

In some examples, at 520, the UE 115-b may determine that a channel impairment, an error rate, an SNR, among other examples, of a wireless channel between the UE 115-b and the base station 105-b satisfies the respective threshold. For example, the UE 115-b may perform an SNR measurement on the wireless channel and compare the SNR to the SNR threshold, in which if the SNR satisfies (for example, exceeds, equals, is lower than) the SNR threshold, the UE 115-b may determine to communicate with the base station 105-b using MLC APSK modulated waveforms. In some examples, the SNR threshold may be based on a phase noise of the wireless channel, a delay spread of the wireless channel, a doppler spread of the wireless channel, or a combination thereof.

At 525, the base station 105-b may transmit and the UE 115-b may receive configuration message, including an indication of a set of waveform parameters for MLC APSK waveforms. For example, the base station 105-b may receive the CSI report at 510 and may transmit an indication of a selected MLC APSK scheme (for example, the set of waveform parameters) to the UE 115-b. The UE 115-b may receive an indication of a set of one or more waveform parameters for the MLC APSK modulated waveform based on the CSI report.

The configuration for the MLC APSK modulated waveform may include a number of rings, a number of constellation points associated with each ring, a radius for each ring of the number of rings, a radii ratio, an SNR threshold, a power amplifier backoff, a dominant impairment threshold, or any combination thereof. In some examples, the configuration message may include an indication of an MCS table and an index of the MCS table such that the UE 115-b may select the set of waveform parameters from the MCS table referencing the MCS index. In some examples, the configuration message may include an indication of an MCS table from a set of (for example, predefined, extended) MCS tables, in which the MCS table may include multiple sets of waveform parameters including the indicated set of waveform parameters. In some examples, the configuration message may include an indication of a configuration for an MLC APSK constellation (for example, a constellation diagram, a coding scheme) associated with the MLC APSK modulated waveform. Additionally, or alternatively, the configuration message may include an indication that the MLC APSK modulated waveform may be configured for MSD, among other examples. The base station 105-b may transmit and the UE 115-b may receive the configuration message at 525 as, or within, a DCI message, RRC signaling, a MAC-CE message, or any combination thereof.

At 530, the base station 105-b and the UE 115-b may communicate using the MLC APSK modulated waveform based on the set of one or more waveform parameters. For example, the UE 115-b may transmit a signal 535 to the base station 105, in which the signal 535 may be an MLC APSK modulated waveform encoded and transmitted using the set of waveform parameters. In another example, the base station 105-b may transmit the signal 535 as an MLC APSK modulated waveform and the UE 115-b may receive the signal 535 using the set of waveform parameters. In some implementations, the MLC APSK modulated waveform may be a single carrier MLC APSK modulated waveform.

Any device of the process flow 500 may perform any step, process, action, among other examples. For example, the UE 115-*b* may be configured to determine, select, and signal a set of waveform parameters associated with an MLC APSK modulated waveform, to the base station 105-*b*. Likewise, the base station 105-*b* may be configured to transmit an indication of a recommended set of waveform parameters to the UE 115-*b*. Further, any wireless device configured to use MLC APSK modulation may perform any aspect of process flow 500 such that process flow 500 may not be restricted to an implementation with solely the base station 105-*b* and the UE 115-*b*.

Figure 6:
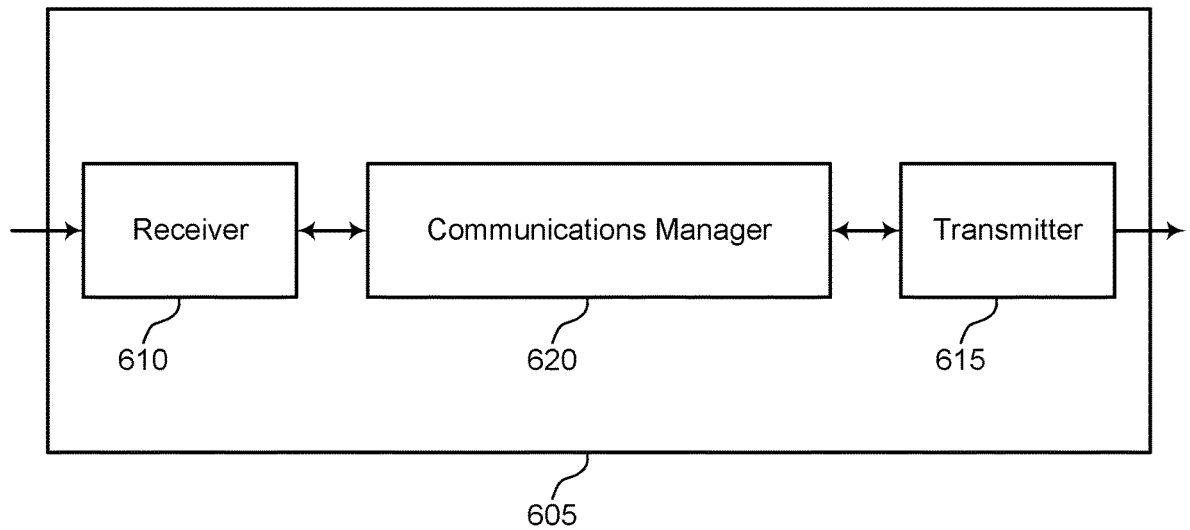
FIGS. 6 and 7 show block diagrams of devices that support single carrier MLC APSK waveforms in accordance with aspects of the present disclosure.

FIG. 6 shows a block diagram of a device 605 that supports a single carrier MLC APSK waveform in accordance with aspects of the present disclosure. The device 605 may be an example of aspects of a UE 115 as described herein. The device 605 may include a receiver 610, a transmitter 615, and a communications manager 620. The communications manager 620 can be implemented, at least in part, by one or both of a modem and a processor. Each of these components may be in communication with one another (for example, via one or more buses).

The receiver 610 may provide a means for receiving information such as packets, user data, control information, or any combination thereof associated with various information channels (for example, control channels, data channels, information channels related to single carrier MLC APSK waveform). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (for example, control channels, data channels, information channels related to single carrier MLC APSK waveform). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of single carrier MLC APSK waveform as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (for example, in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally or alternatively, in some examples, the communications manager 620, the receiver 610, the transmitter 615, or various combinations or components thereof may be implemented in code (for example, as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (for example, configured as or otherwise supporting a means for performing the functions described in the present disclosure).

In some examples, the communications manager 620 may be configured to perform various operations (for example, receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for transmitting, to a base station, a CSI report indicating an MLC APSK modulated waveform. The communications manager 620 may be configured as or otherwise support a means for receiving, from the base station, an indication of a set of one or more waveform parameters for the MLC APSK modulated waveform based on the CSI report. The communications manager 620 may be configured as or otherwise support a means for communicating with the base station using the MLC APSK modulated waveform based on the set of one or more waveform parameters.

By including or configuring the communications manager 620 in accordance with examples as described herein, the device 605 (for example, a processor controlling or otherwise coupled to the receiver 610, the transmitter 615, the communications manager 620, or a combination thereof) may support techniques for implementing MLC with APSK modulation to configure unequal (i.e., different) error protection for different bits. A device 605 configured to use MLC may support unequal error protection by dividing a set of bits into two or more subsets, in which each subset may correspond to a different coding level. Each subset may correspond to a respective coding level, such that the device 605 may enable a transmitter to encode each subset of bits using a different code having a different code rate, configuring devices to support improvements to phase noise resiliency, non-linearity resiliency, higher energy efficiency, among other improvements.

Figure 7:
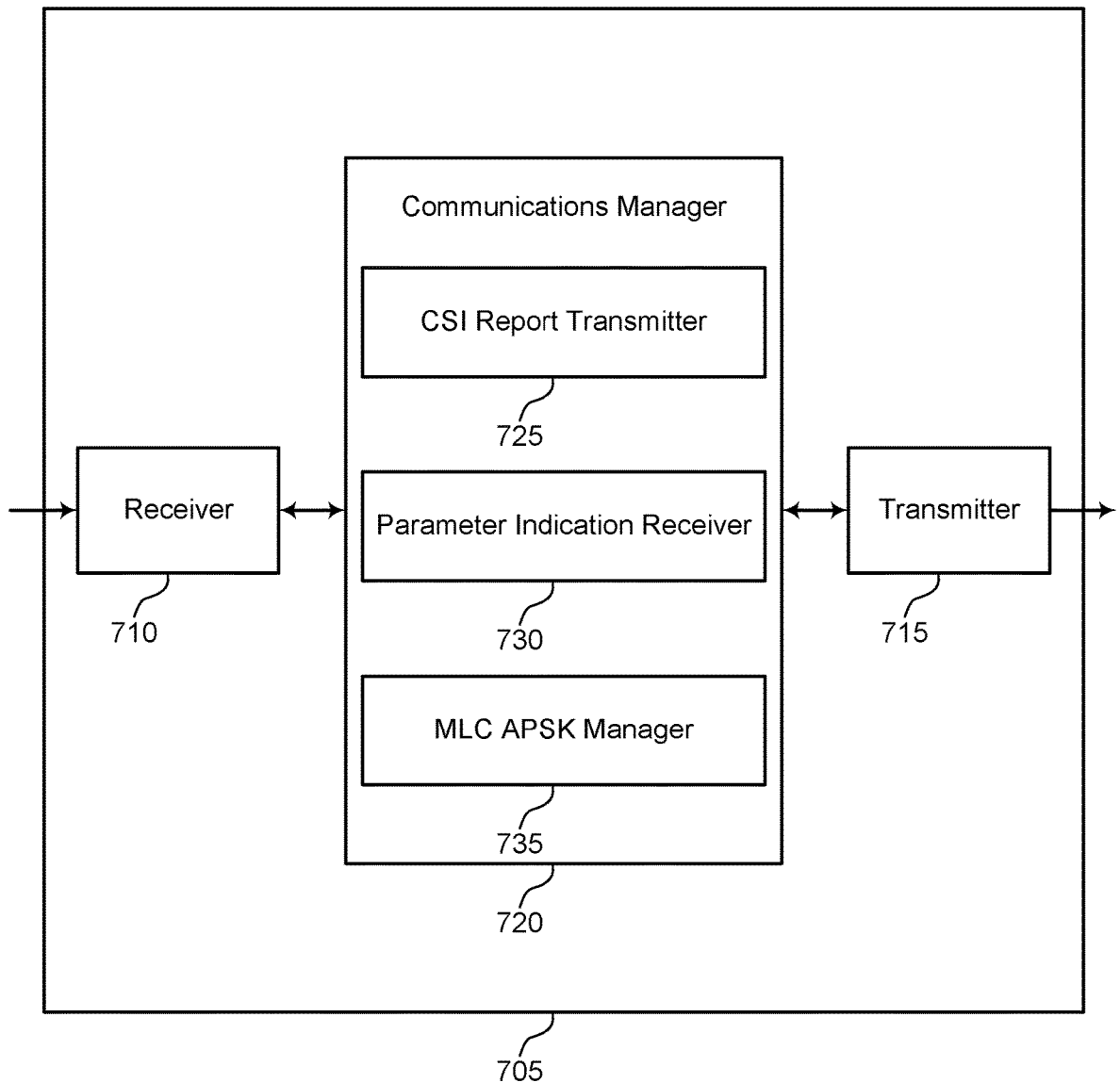

FIG. 7 shows a block diagram of a device 705 that supports a single carrier MLC APSK waveform in accordance with aspects of the present disclosure. The device 705 may be an example of aspects of a device 605 or a UE 115 as described herein. The device 705 may include a receiver 710, a transmitter 715, and a communications manager 720. The communications manager 720 can be implemented, at least in part, by one or both of a modem and a processor. Each of these components may be in communication with one another (for example, via one or more buses).

The receiver 710 may provide a means for receiving information such as packets, user data, control information, or any combination thereof associated with various information channels (for example, control channels, data channels, information channels related to single carrier MLC APSK waveform). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (for example, control channels, data channels, information channels related to single carrier MLC APSK waveform). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of single carrier MLC APSK waveform as described herein. For example, the communications manager 720 may include a CSI report transmitter 725, a parameter indication receiver 730, an MLC APSK manager 735, or any combination thereof. In some examples, the communications manager 720, or various components thereof, may be configured to perform various operations (for example, receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The CSI report transmitter 725 may be configured as or otherwise support a means for transmitting, to a base station, a CSI report indicating an MLC APSK modulated waveform. The parameter indication receiver 730 may be configured as or otherwise support a means for receiving, from the base station, an indication of a set of one or more waveform parameters for the MLC APSK modulated waveform based on the CSI report. The MLC APSK manager 735 may be configured as or otherwise support a means for communicating with the base station using the MLC APSK modulated waveform based on the set of one or more waveform parameters.

Figure 8:
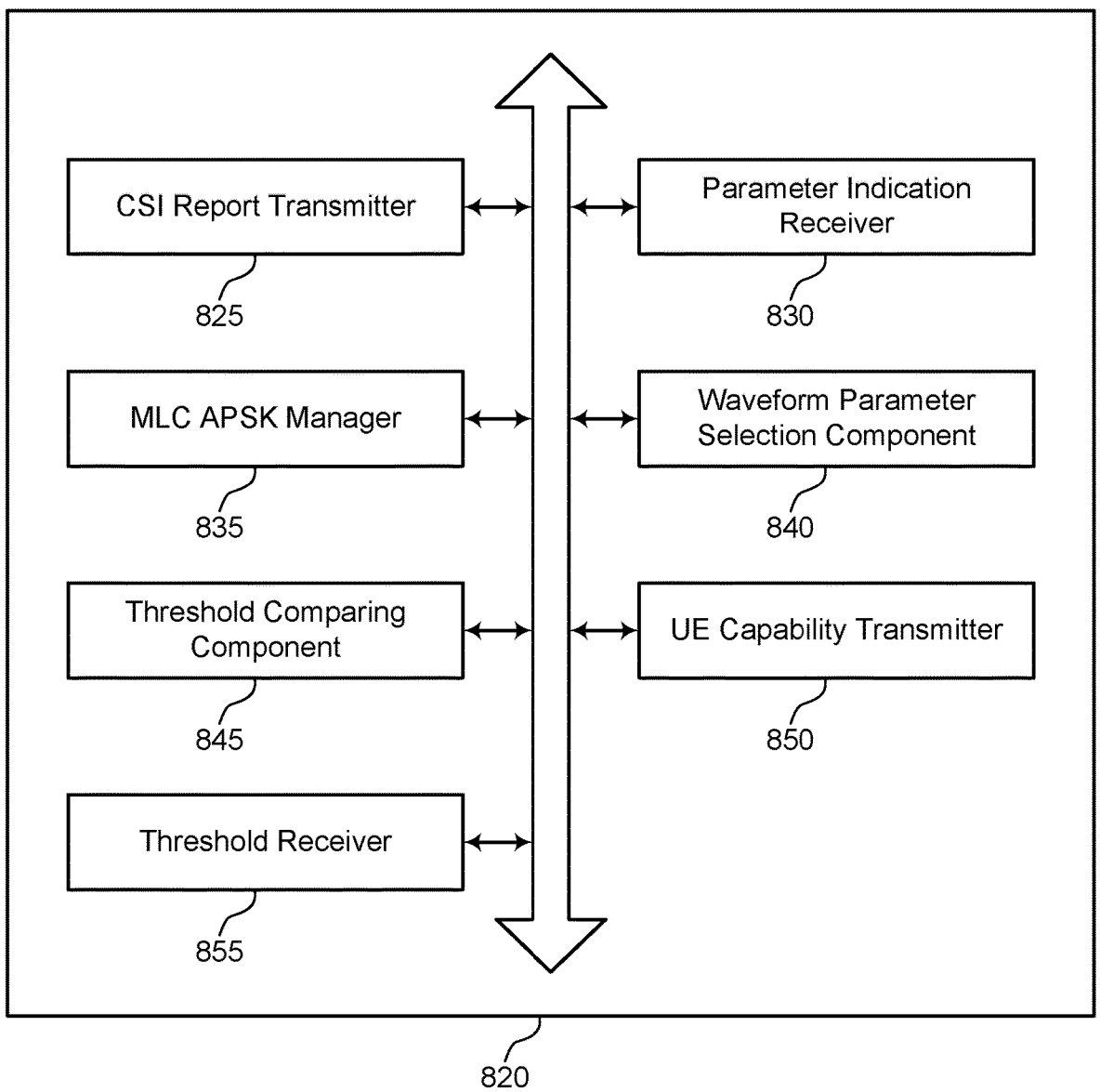
FIG. 8 shows a block diagram of a communications manager that supports a single carrier MLC APSK waveform in accordance with aspects of the present disclosure.

FIG. 8 shows a block diagram of a communications manager 820 that supports a single carrier MLC APSK waveform in accordance with aspects of the present disclosure. The communications manager 820, or various components thereof, may be an example of means for performing various aspects of single carrier MLC APSK waveform as described herein. For example, the communications manager 820 may include a CSI report transmitter 825, a parameter indication receiver 830, an MLC APSK manager 835, a waveform parameter selection component 840, a threshold comparing component 845, a UE capability transmitter 850, a threshold receiver 855, or any combination thereof. Each of these components may communicate, directly or indirectly, with one another (for example, via one or more buses).

The communications manager 820 may support wireless communication at a UE in accordance with examples as disclosed herein. The CSI report transmitter 825 may be configured as or otherwise support a means for transmitting, to a base station, a CSI report indicating an MLC APSK modulated waveform. The parameter indication receiver 830 may be configured as or otherwise support a means for receiving, from the base station, an indication of a set of one or more waveform parameters for the MLC APSK modulated waveform based on the CSI report. The MLC APSK manager 835 may be configured as or otherwise support a means for communicating with the base station using the MLC APSK modulated waveform based on the set of one or more waveform parameters.

In some examples, to support receiving the indication of the set of one or more waveform parameters, the parameter indication receiver 830 may be configured as or otherwise support a means for receiving an indication of an MCS table and an index to the MCS table. In some examples, to support receiving the indication of the set of one or more waveform parameters, the waveform parameter selection component 840 may be configured as or otherwise support a means for selecting the set of one or more waveform parameters from the MCS table based on the index.

In some examples, to support receiving the indication of the set of one or more waveform parameters, the parameter indication receiver 830 may be configured as or otherwise support a means for receiving an indication of a configuration for an MLC APSK constellation associated with the MLC APSK modulated waveform.

In some examples, to support receiving the indication of the set of one or more waveform parameters, the parameter indication receiver 830 may be configured as or otherwise support a means for receiving an indication that the MLC APSK modulated waveform is configured for MSD or PID.

In some examples, to support receiving the indication of the set of one or more waveform parameters, the parameter indication receiver 830 may be configured as or otherwise support a means for receiving an indication of an MCS table of a set of multiple MCS tables, in which the MCS table includes a set of multiple sets of one or more waveform parameters including the set of one or more waveform parameters.

In some examples, the threshold comparing component 845 may be configured as or otherwise support a means for determining that an SNR of a wireless channel between the UE and the base station satisfies an SNR threshold, in which the communicating with the base station using the MLC APSK modulated waveform is based on satisfaction of the SNR threshold.

In some examples, the threshold receiver 855 may be configured as or otherwise support a means for receiving an indication of the SNR threshold from the base station via a DCI message, RRC signaling, a MAC-CE, or any combination thereof.

In some examples, the SNR threshold is based on a phase noise of the wireless channel, a delay spread of the wireless channel, a doppler spread of the wireless channel, or any combination thereof.

In some examples, to support transmitting the CSI report, the CSI report transmitter 825 may be configured as or otherwise support a means for transmitting a request of the set of one or more waveform parameters for the MLC APSK modulated waveform.

In some examples, the MLC APSK modulated waveform is a single carrier MLC APSK waveform.

In some examples, the UE capability transmitter 850 may be configured as or otherwise support a means for transmitting an indication of a UE capability for communicating using the MLC APSK modulated waveform, in which the indication of the set of one or more waveform parameters is received based on the indication of the UE capability.

In some examples, to support communicating with the base station using the MLC APSK modulated waveform, the MLC APSK manager 835 may be configured as or otherwise support a means for transmitting a signal with the MLC APSK modulated waveform to the base station based on the set of one or more waveform parameters.

In some examples, to support communicating with the base station using the MLC APSK modulated waveform, the MLC APSK manager 835 may be configured as or otherwise support a means for receiving a signal with the MLC APSK modulated waveform from the base station based on the set of one or more waveform parameters.

In some examples, to support receiving the indication of the set of one or more waveform parameters, the parameter indication receiver 830 may be configured as or otherwise support a means for receiving the indication of the set of one or more waveform parameters via a DCI message, RRC signaling, a MAC-CE, or any combination thereof.

Figure 9:
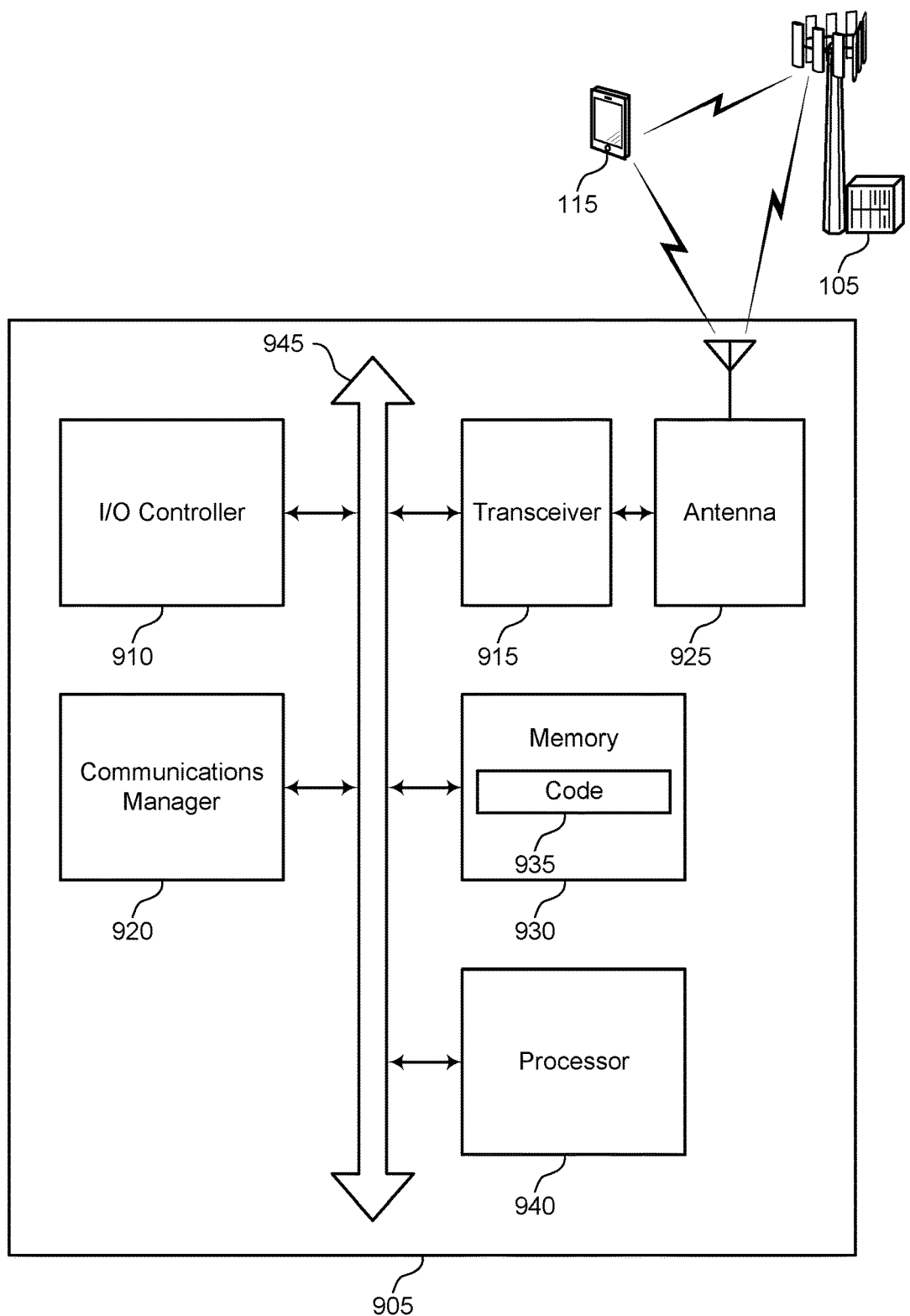
FIG. 9 shows a diagram of a system including a device that supports a single carrier MLC APSK waveform in accordance with aspects of the present disclosure.

FIG. 9 shows a diagram of a system including a device 905 that supports a single carrier MLC APSK waveform in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (for example, operatively, communicatively, functionally, electronically, electrically) via one or more buses (for example, a bus 945).

The I/O controller 910 may manage input and output signals for the device 905. The I/O controller 910 may also manage peripherals not integrated into the device 905. In some examples, the I/O controller 910 may represent a physical connection or port to an external peripheral. In some examples, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some examples, the I/O controller 910 may be implemented as part of a processor, such as the processor 940. In some examples, a user may interact with the device 905 via the I/O controller 910 or via hardware components controlled by the I/O controller 910.

In some examples, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, if executed by the processor 940, cause the device 905 to perform various functions described herein. The code 935 may be stored in a non-transitory computer-readable medium such as system memory or another type of memory. In some examples, the code 935 may not be directly executable by the processor 940 but may cause a computer (for example, if compiled and executed) to perform functions described herein. In some examples, the memory 930 may contain, among other things, a basic I/O system (BIOS) which may control basic hardware or software operation such as the interaction with peripheral components or devices.

The processor 940 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 940 may be configured to operate a memory array using a memory controller. In some other cases, a memory controller may be integrated into the processor 940. The processor 940 may be configured to execute computer-readable instructions stored in a memory (for example, the memory 930) to cause the device 905 to perform various functions (for example, functions or tasks supporting single carrier MLC APSK waveform). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for transmitting, to a base station, a CSI report indicating an MLC APSK modulated waveform. The communications manager 920 may be configured as or otherwise support a means for receiving, from the base station, an indication of a set of one or more waveform parameters for the MLC APSK modulated waveform based on the CSI report. The communications manager 920 may be configured as or otherwise support a means for communicating with the base station using the MLC APSK modulated waveform based on the set of one or more waveform parameters.

By including or configuring the communications manager 920 in accordance with examples as described herein, the device 905 may support techniques for implementing MLC with APSK modulation to configure unequal (i.e., different) error protection for different bits. A device 905 configured to use MLC may support unequal error protection by dividing a set of bits into two or more subsets, in which each subset may correspond to a different coding level. Each subset may correspond to a respective coding level, such that the device 905 may enable a transmitter to encode each subset of bits using a different code having a different code rate, configuring devices to support improved communication reliability, reduced latency, reduced power consumption, more efficient utilization of communication resources, improved coordination between devices, longer battery life, among other examples.

In some examples, the communications manager 920 may be configured to perform various operations (for example, receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of single carrier MLC APSK waveform as described herein, or the processor 940 and the memory 930 may be otherwise configured to perform or support such operations.

Figure 10:
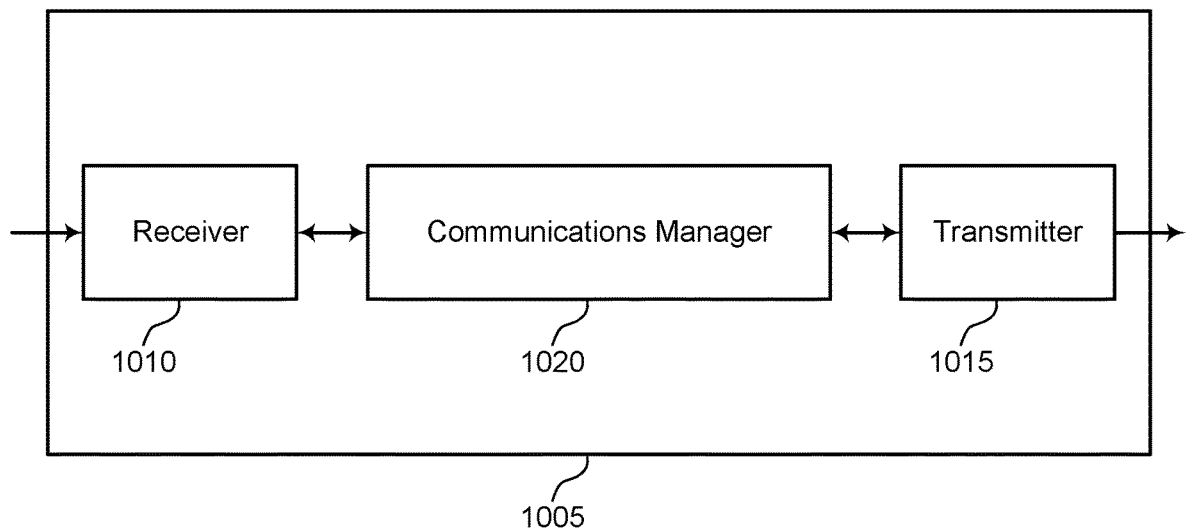
FIGS. 10 and 11 show block diagrams of devices that support single carrier MLC APSK waveforms in accordance with aspects of the present disclosure.

FIG. 10 shows a block diagram of a device 1005 that supports a single carrier MLC APSK waveform in accordance with aspects of the present disclosure. The device 1005 may be an example of aspects of a base station 105 as described herein. The device 1005 may include a receiver 1010, a transmitter 1015, and a communications manager 1020. The communications manager 1020 can be implemented, at least in part, by one or both of a modem and a processor. Each of these components may be in communication with one another (for example, via one or more buses).

The receiver 1010 may provide a means for receiving information such as packets, user data, control information, or any combination thereof associated with various information channels (for example, control channels, data channels, information channels related to single carrier MLC APSK waveform). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (for example, control channels, data channels, information channels related to single carrier MLC APSK waveform). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of single carrier MLC APSK waveform as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (for example, in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally or alternatively, in some examples, the communications manager 1020, the receiver 1010, the transmitter 1015, or various combinations or components thereof may be implemented in code (for example, as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (for example, configured as or otherwise supporting a means for performing the functions described in the present disclosure).

In some examples, the communications manager 1020 may be configured to perform various operations (for example, receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for receiving, from a UE, a CSI report indicating an MLC APSK modulated waveform. The communications manager 1020 may be configured as or otherwise support a means for transmitting, to the UE, an indication of a set of one or more waveform parameters for the MLC APSK modulated waveform based on the CSI report. The communications manager 1020 may be configured as or otherwise support a means for communicating with the UE using the MLC APSK modulated waveform based on the set of one or more waveform parameters.

By including or configuring the communications manager 1020 in accordance with examples as described herein, the device 1005 (for example, a processor controlling or otherwise coupled to the receiver 1010, the transmitter 1015, the communications manager 1020, or a combination thereof) may support techniques for implementing MLC with APSK modulation to configure unequal (i.e., different) error protection for different bits. A device 1005 configured to use MLC may support unequal error protection by dividing a set of bits into two or more subsets, in which each subset may correspond to a different coding level. Each subset may correspond to a respective coding level, such that the device 1005 may enable a transmitter to encode each subset of bits using a different code having a different code rate, configuring devices to support improvements to phase noise resiliency, non-linearity resiliency, higher energy efficiency, among other improvements.

Figure 11:
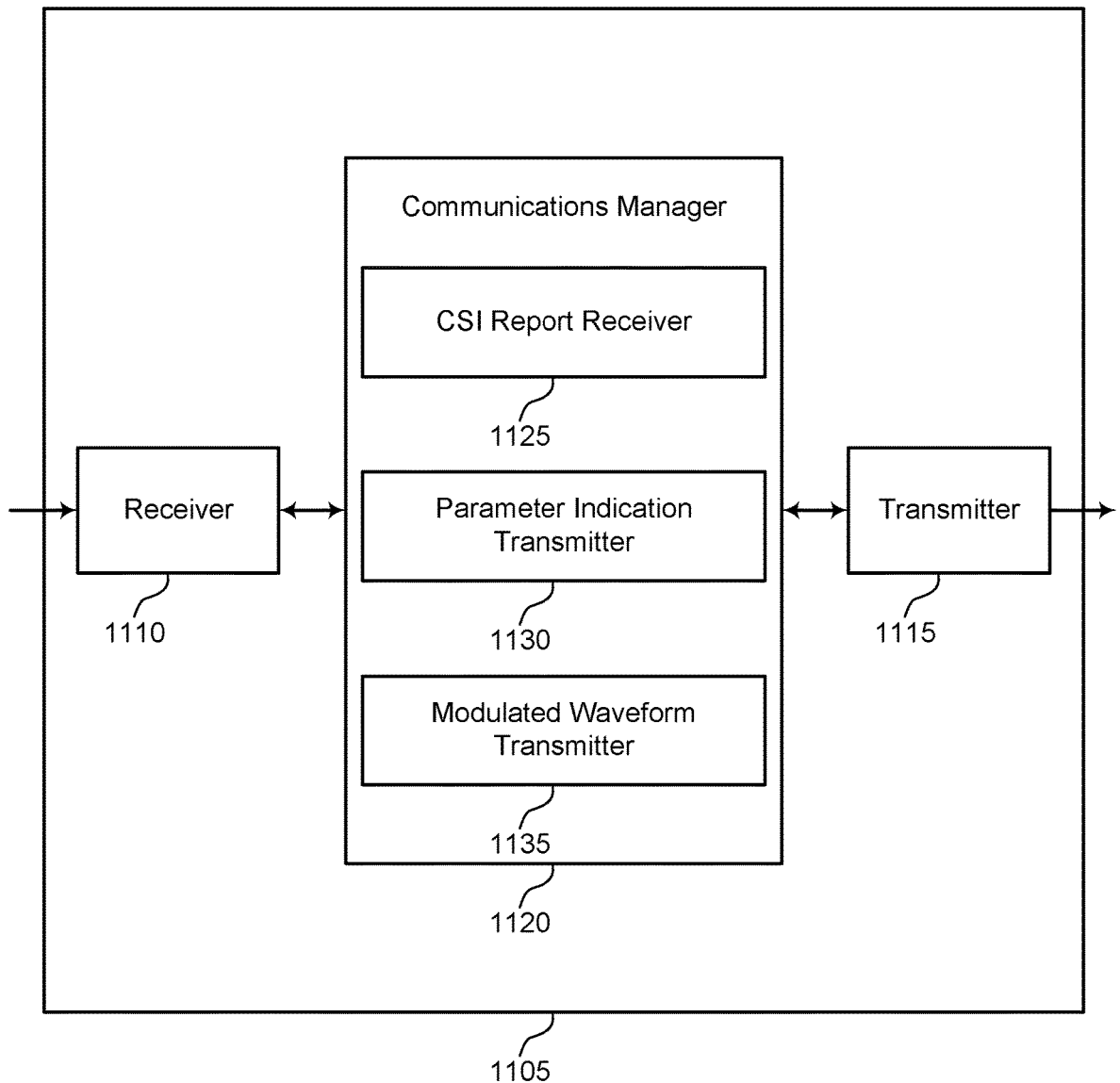

FIG. 11 shows a block diagram of a device 1105 that supports a single carrier MLC APSK waveform in accordance with aspects of the present disclosure. The device 1105 may be an example of aspects of a device 1005 or a base station 105 as described herein. The device 1105 may include a receiver 1110, a transmitter 1115, and a communications manager 1120. The communications manager 1120 can be implemented, at least in part, by one or both of a modem and a processor. Each of these components may be in communication with one another (for example, via one or more buses).

The receiver 1110 may provide a means for receiving information such as packets, user data, control information, or any combination thereof associated with various information channels (for example, control channels, data channels, information channels related to single carrier MLC APSK waveform). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (for example, control channels, data channels, information channels related to single carrier MLC APSK waveform). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of single carrier MLC APSK waveform as described herein. For example, the communications manager 1120 may include a CSI report receiver 1125, a parameter indication transmitter 1130, a modulated waveform transmitter 1135, or any combination thereof. In some examples, the communications manager 1120, or various components thereof, may be configured to perform various operations (for example, receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The CSI report receiver 1125 may be configured as or otherwise support a means for receiving, from a UE, a CSI report indicating an MLC APSK modulated waveform. The parameter indication transmitter 1130 may be configured as or otherwise support a means for transmitting, to the UE, an indication of a set of one or more waveform parameters for the MLC APSK modulated waveform based on the CSI report. The modulated waveform transmitter 1135 may be configured as or otherwise support a means for communicating with the UE using the MLC APSK modulated waveform based on the set of one or more waveform parameters.

Figure 12:
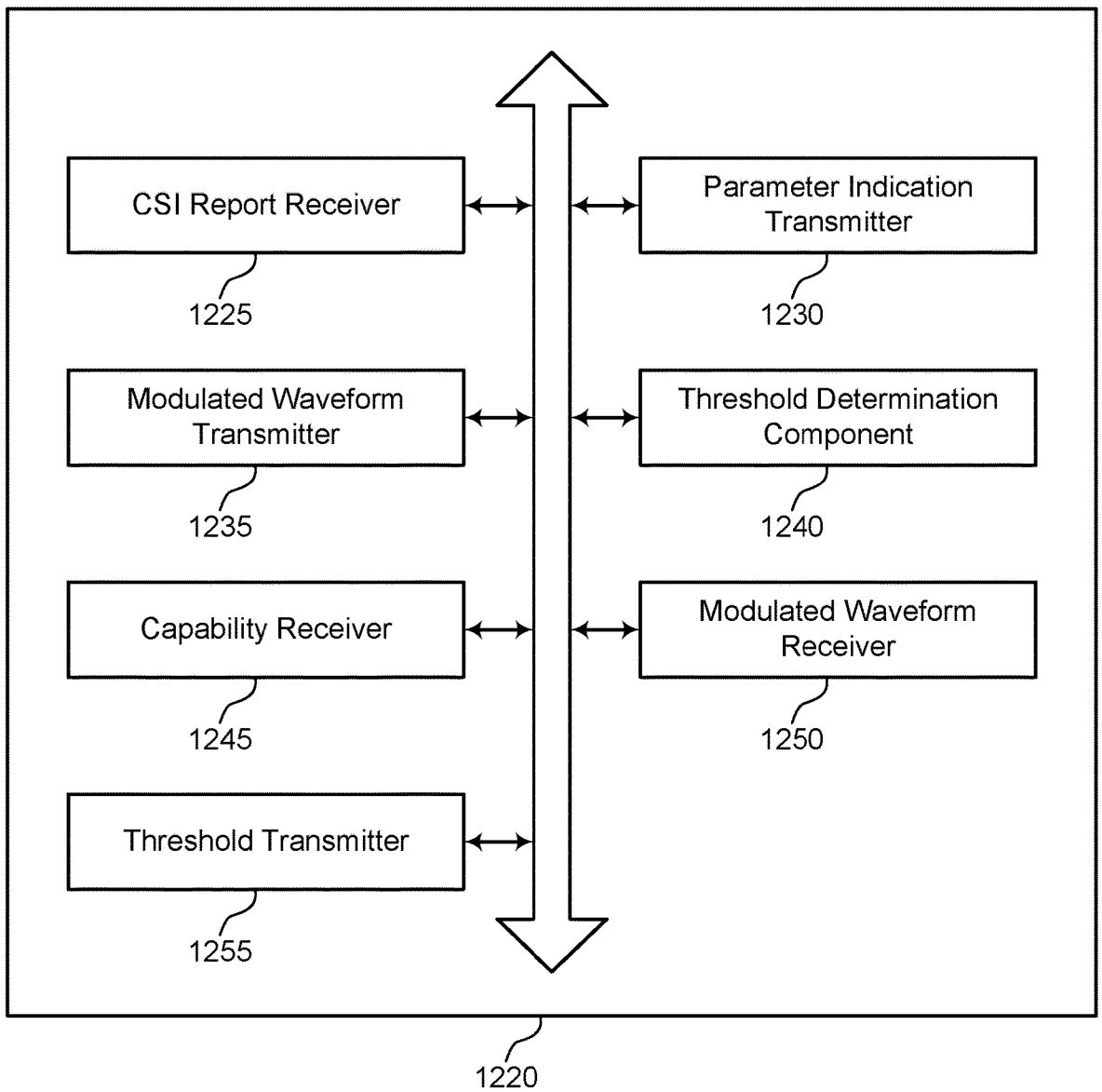
FIG. 12 shows a block diagram of a communications manager that supports a single carrier MLC APSK waveform in accordance with aspects of the present disclosure.

FIG. 12 shows a block diagram of a communications manager 1220 that supports a single carrier MLC APSK waveform in accordance with aspects of the present disclosure. The communications manager 1220, or various components thereof, may be an example of means for performing various aspects of single carrier MLC APSK waveform as described herein. For example, the communications manager 1220 may include a CSI report receiver 1225, a parameter indication transmitter 1230, a modulated waveform transmitter 1235, a threshold determination component 1240, a capability receiver 1245, a modulated waveform receiver 1250, a threshold transmitter 1255, or any combination thereof. Each of these components may communicate, directly or indirectly, with one another (for example, via one or more buses).

The communications manager 1220 may support wireless communication at a base station in accordance with examples as disclosed herein. The CSI report receiver 1225 may be configured as or otherwise support a means for receiving, from a UE, a CSI report indicating an MLC APSK modulated waveform. The parameter indication transmitter 1230 may be configured as or otherwise support a means for transmitting, to the UE, an indication of a set of one or more waveform parameters for the MLC APSK modulated waveform based on the CSI report. The modulated waveform transmitter 1235 may be configured as or otherwise support a means for communicating with the UE using the MLC APSK modulated waveform based on the set of one or more waveform parameters.

In some examples, to support transmitting the indication of the set of one or more waveform parameters, the parameter indication transmitter 1230 may be configured as or otherwise support a means for transmitting an indication of an MCS table and an index to the MCS table, in which the index to the MCS table corresponds to the set of one or more waveform parameters.

In some examples, to support transmitting the indication of the set of one or more waveform parameters, the parameter indication transmitter 1230 may be configured as or otherwise support a means for transmitting an indication of a configuration for an MLC APSK constellation associated with the MLC APSK modulated waveform, in which the configuration for the MLC APSK constellation includes a number of rings, a number of constellation points associated with each ring, a radius for each ring of the number of rings, a radii ratio, an SNR threshold, a power amplifier backoff, a dominant impairment threshold, or any combination thereof.

In some examples, to support transmitting the indication of the set of one or more waveform parameters, the parameter indication transmitter 1230 may be configured as or otherwise support a means for transmitting an indication that the MLC APSK modulated waveform is configured for MSD or PID.

In some examples, to support transmitting the indication of the set of one or more waveform parameters, the parameter indication transmitter 1230 may be configured as or otherwise support a means for transmitting an indication of an MCS table of a set of multiple MCS tables, in which the MCS table includes a set of multiple sets of one or more waveform parameters including the set of one or more waveform parameters.

In some examples, the threshold determination component 1240 may be configured as or otherwise support a means for determining that an SNR of a wireless channel between the UE and the base station satisfies an SNR threshold, in which the MLC APSK modulated waveform is used to communicate with the UE based on the SNR threshold being satisfied.

In some examples, the threshold transmitter 1255 may be configured as or otherwise support a means for transmitting an indication of the SNR threshold to the UE via a DCI message, RRC signaling, a MAC-CE, or any combination thereof.

In some examples, the SNR threshold is based on a phase noise of the wireless channel, a delay spread of the wireless channel, a doppler spread of the wireless channel, or any combination thereof.

In some examples, to support receiving the CSI report, the CSI report receiver 1225 may be configured as or otherwise support a means for receiving a request of the set of one or more waveform parameters for the MLC APSK modulated waveform.

In some examples, the MLC APSK modulated waveform is a single-carrier MLC APSK modulated waveform.

In some examples, the capability receiver 1245 may be configured as or otherwise support a means for receiving an indication of a UE capability for using the MLC APSK modulated waveform, in which the indication of the set of one or more waveform parameters is transmitted based on the indication of the UE capability.

In some examples, to support communicating with the UE using the MLC APSK modulated waveform, the modulated waveform receiver 1250 may be configured as or otherwise support a means for receiving a signal with the MLC APSK modulated waveform from the UE based on the set of one or more waveform parameters.

In some examples, to support communicating with the UE using the MLC APSK modulated waveform, the modulated waveform transmitter 1235 may be configured as or otherwise support a means for transmitting a signal with the MLC APSK modulated waveform to the UE based on the set of one or more waveform parameters.

In some examples, to support transmitting the indication of the set of one or more waveform parameters, the parameter indication transmitter 1230 may be configured as or otherwise support a means for transmitting the indication of the set of one or more waveform parameters via a DCI message, RRC signaling, a MAC-CE, or any combination thereof.

Figure 13:
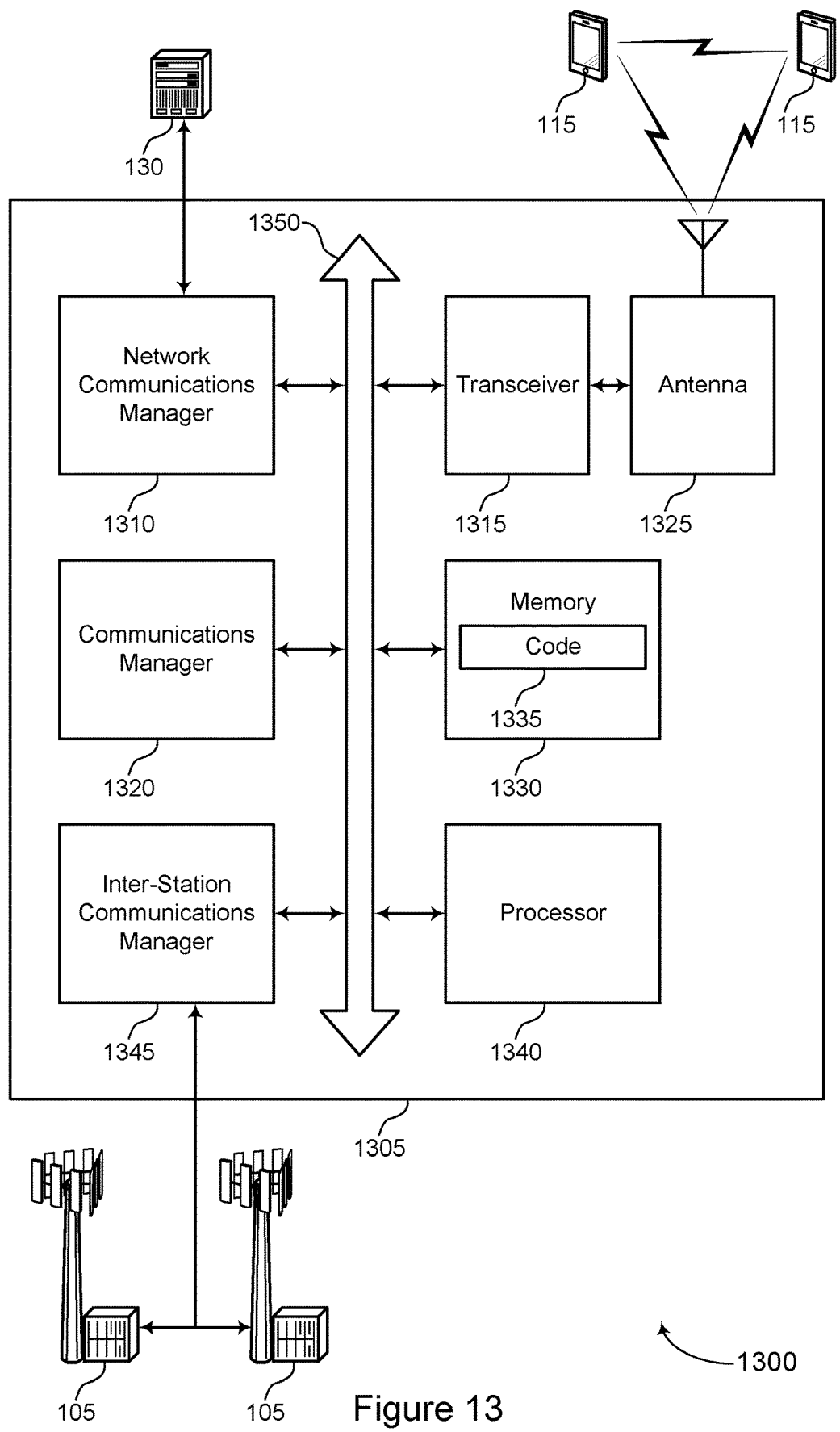
FIG. 13 shows a diagram of a system including a device that supports a single carrier MLC APSK waveform in accordance with aspects of the present disclosure.

FIG. 13 shows a diagram of a system including a device 1305 that supports a single carrier MLC APSK waveform in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (for example, operatively, communicatively, functionally, electronically, electrically) via one or more buses (for example, a bus 1350).

The network communications manager 1310 may manage communications with a core network 130 (for example, via one or more wired backhaul links). For example, the network communications manager 1310 may manage the transfer of data communications for client devices, such as one or more UEs 115.

In some examples, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, if executed by the processor 1340, cause the device 1305 to perform various functions described herein. The code 1335 may be stored in a non-transitory computer-readable medium such as system memory or another type of memory. In some examples, the code 1335 may not be directly executable by the processor 1340 but may cause a computer (for example, if compiled and executed) to perform functions described herein. In some examples, the memory 1330 may contain, among other things, a BIOS which may control basic hardware or software operation such as the interaction with peripheral components or devices.

The processor 1340 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1340 may be configured to operate a memory array using a memory controller. In some other cases, a memory controller may be integrated into the processor 1340. The processor 1340 may be configured to execute computer-readable instructions stored in a memory (for example, the memory 1330) to cause the device 1305 to perform various functions (for example, functions or tasks supporting single carrier MLC APSK waveform). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for receiving, from a UE, a CSI report indicating an MLC APSK modulated waveform. The communications manager 1320 may be configured as or otherwise support a means for transmitting, to the UE, an indication of a set of one or more waveform parameters for the MLC APSK modulated waveform based on the CSI report. The communications manager 1320 may be configured as or otherwise support a means for communicating with the UE using the MLC APSK modulated waveform based on the set of one or more waveform parameters.

By including or configuring the communications manager 1320 in accordance with examples as described herein, the device 1305 may support techniques for implementing MLC with APSK modulation to configure unequal (i.e., different) error protection for different bits. A device 1305 configured to use MLC may support unequal error protection by dividing a set of bits into two or more subsets, in which each subset may correspond to a different coding level. Each subset may correspond to a respective coding level, such that the device 1305 may enable a transmitter to encode each subset of bits using a different code having a different code rate, configuring devices to support improved communication reliability, reduced latency, reduced power consumption, more efficient utilization of communication resources, improved coordination between devices, longer battery life, among other examples.

In some examples, the communications manager 1320 may be configured to perform various operations (for example, receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of single carrier MLC APSK waveform as described herein, or the processor 1340 and the memory 1330 may be otherwise configured to perform or support such operations.

Figure 14:
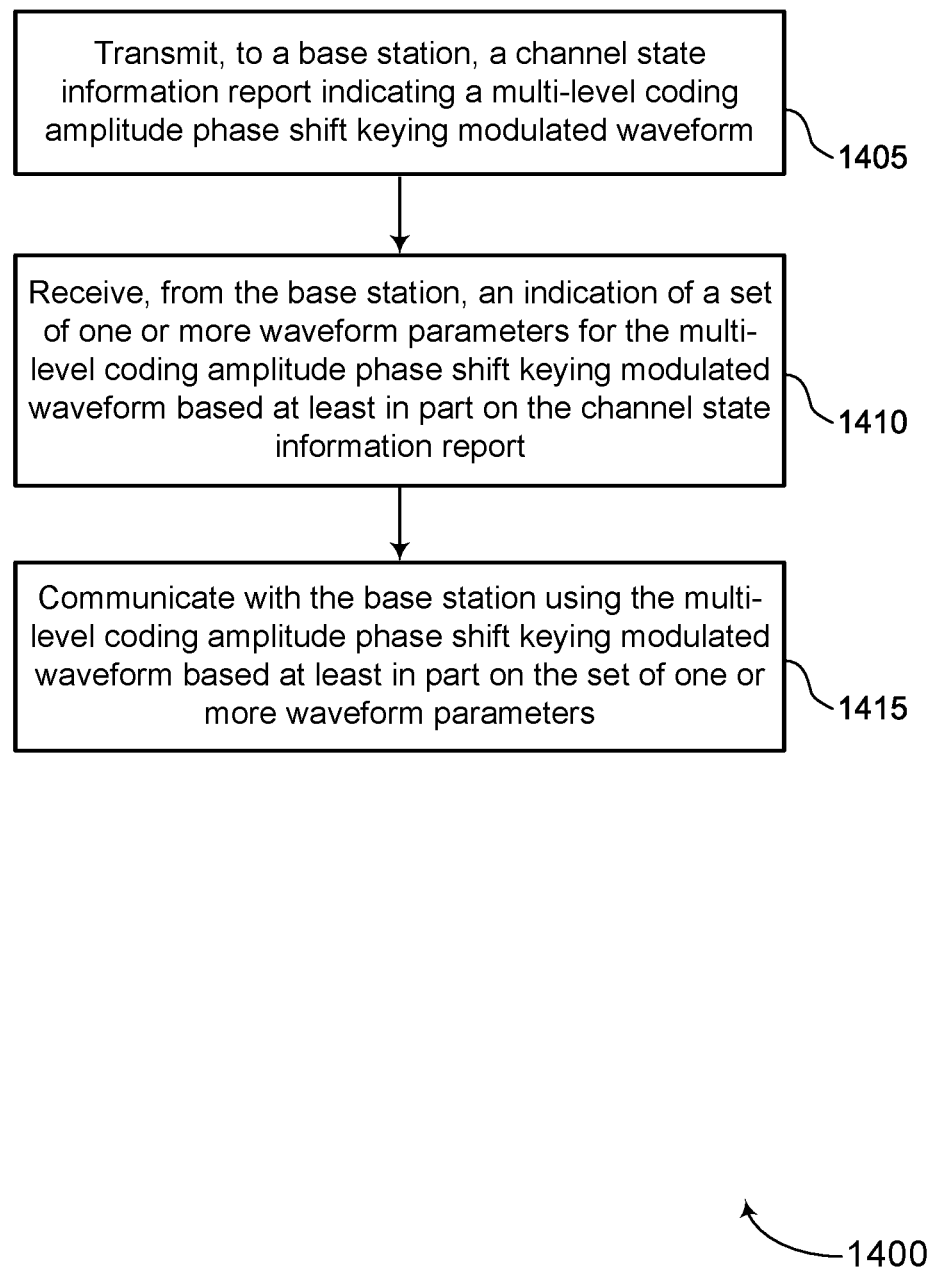
FIGS. 14-19 show flowcharts illustrating methods that support single carrier MLC APSK waveforms in accordance with aspects of the present disclosure.

FIG. 14 shows a flowchart illustrating a method 1400 that supports a single carrier MLC APSK waveform in accordance with aspects of the present disclosure. The operations of the method 1400 may be implemented by a UE or its components as described herein. For example, the operations of the method 1400 may be performed by a UE 115 as described with reference to FIGS. 1-9. In some examples, a UE may execute a set of instructions to control the functional elements of the UE to perform the described functions. Additionally or alternatively, the UE may perform aspects of the described functions using special-purpose hardware.

At 1405, the method may include transmitting, to a base station, a CSI report indicating an MLC APSK modulated waveform. The operations of 1405 may be performed in accordance with examples as disclosed herein. In some examples, aspects of the operations of 1405 may be performed by a CSI report transmitter 825 as described with reference to FIG. 8.

At 1410, the method may include receiving, from the base station, an indication of a set of one or more waveform parameters for the MLC APSK modulated waveform based on the CSI report. The operations of 1410 may be performed in accordance with examples as disclosed herein. In some examples, aspects of the operations of 1410 may be performed by a parameter indication receiver 830 as described with reference to FIG. 8.

At 1415, the method may include communicating with the base station using the MLC APSK modulated waveform based on the set of one or more waveform parameters. The operations of 1415 may be performed in accordance with examples as disclosed herein. In some examples, aspects of the operations of 1415 may be performed by an MLC APSK manager 835 as described with reference to FIG. 8.

Figure 15:
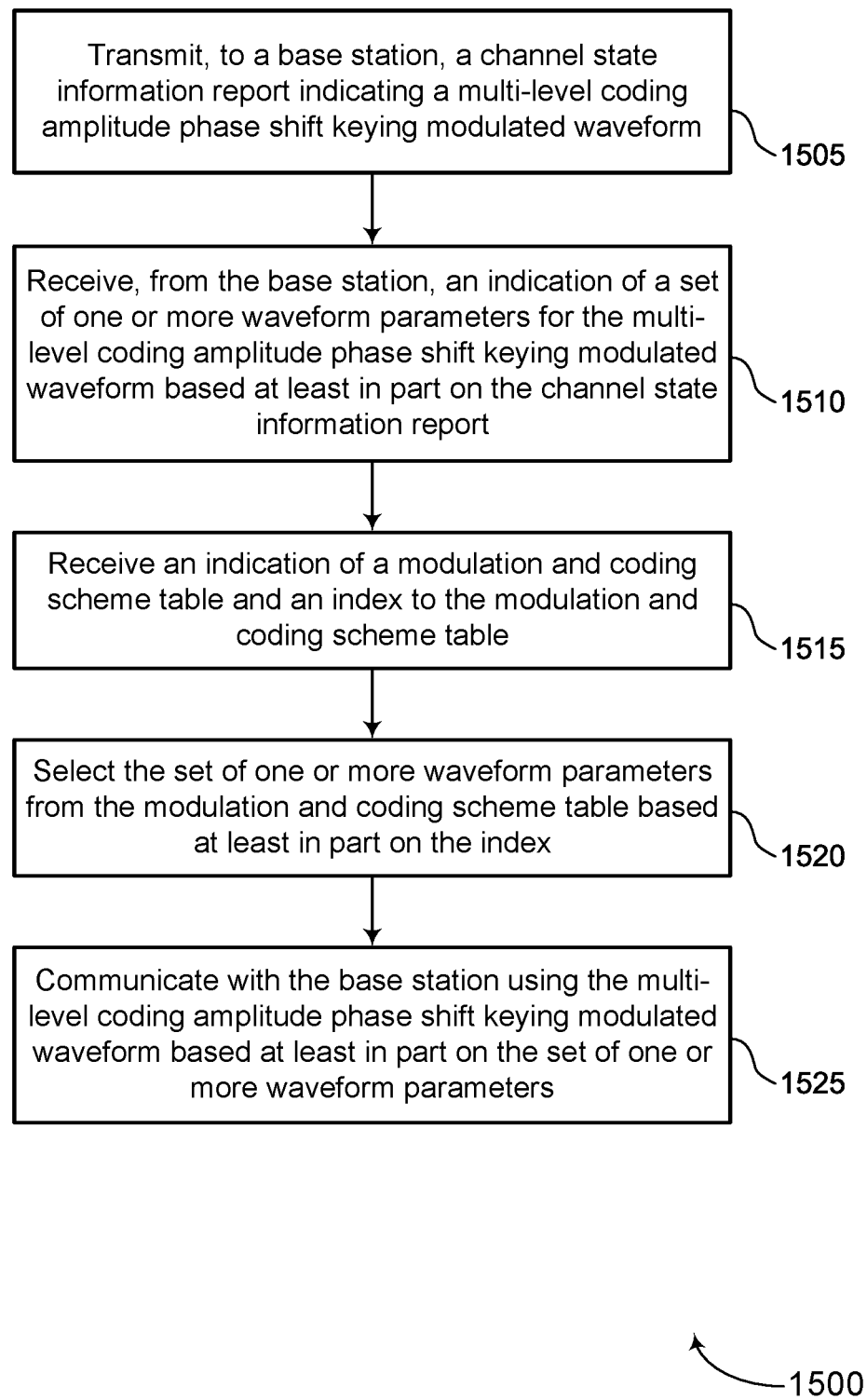

FIG. 15 shows a flowchart illustrating a method 1500 that supports a single carrier MLC APSK waveform in accordance with aspects of the present disclosure. The operations of the method 1500 may be implemented by a UE or its components as described herein. For example, the operations of the method 1500 may be performed by a UE 115 as described with reference to FIGS. 1-9. In some examples, a UE may execute a set of instructions to control the functional elements of the UE to perform the described functions. Additionally or alternatively, the UE may perform aspects of the described functions using special-purpose hardware.

At 1505, the method may include transmitting, to a base station, a CSI report indicating an MLC APSK modulated waveform. The operations of 1505 may be performed in accordance with examples as disclosed herein. In some examples, aspects of the operations of 1505 may be performed by a CSI report transmitter 825 as described with reference to FIG. 8.

At 1510, the method may include receiving, from the base station, an indication of a set of one or more waveform parameters for the MLC APSK modulated waveform based on the CSI report. The operations of 1510 may be performed in accordance with examples as disclosed herein. In some examples, aspects of the operations of 1510 may be performed by a parameter indication receiver 830 as described with reference to FIG. 8.

At 1515, the method may include receiving an indication of an MCS table and an index to the MCS table. The operations of 1515 may be performed in accordance with examples as disclosed herein. In some examples, aspects of the operations of 1515 may be performed by a parameter indication receiver 830 as described with reference to FIG. 8.

At 1520, the method may include selecting the set of one or more waveform parameters from the MCS table based on the index. The operations of 1520 may be performed in accordance with examples as disclosed herein. In some examples, aspects of the operations of 1520 may be performed by a waveform parameter selection component 840 as described with reference to FIG. 8.

At 1525, the method may include communicating with the base station using the MLC APSK modulated waveform based on the set of one or more waveform parameters. The operations of 1525 may be performed in accordance with examples as disclosed herein. In some examples, aspects of the operations of 1525 may be performed by an MLC APSK manager 835 as described with reference to FIG. 8.

Figure 16:
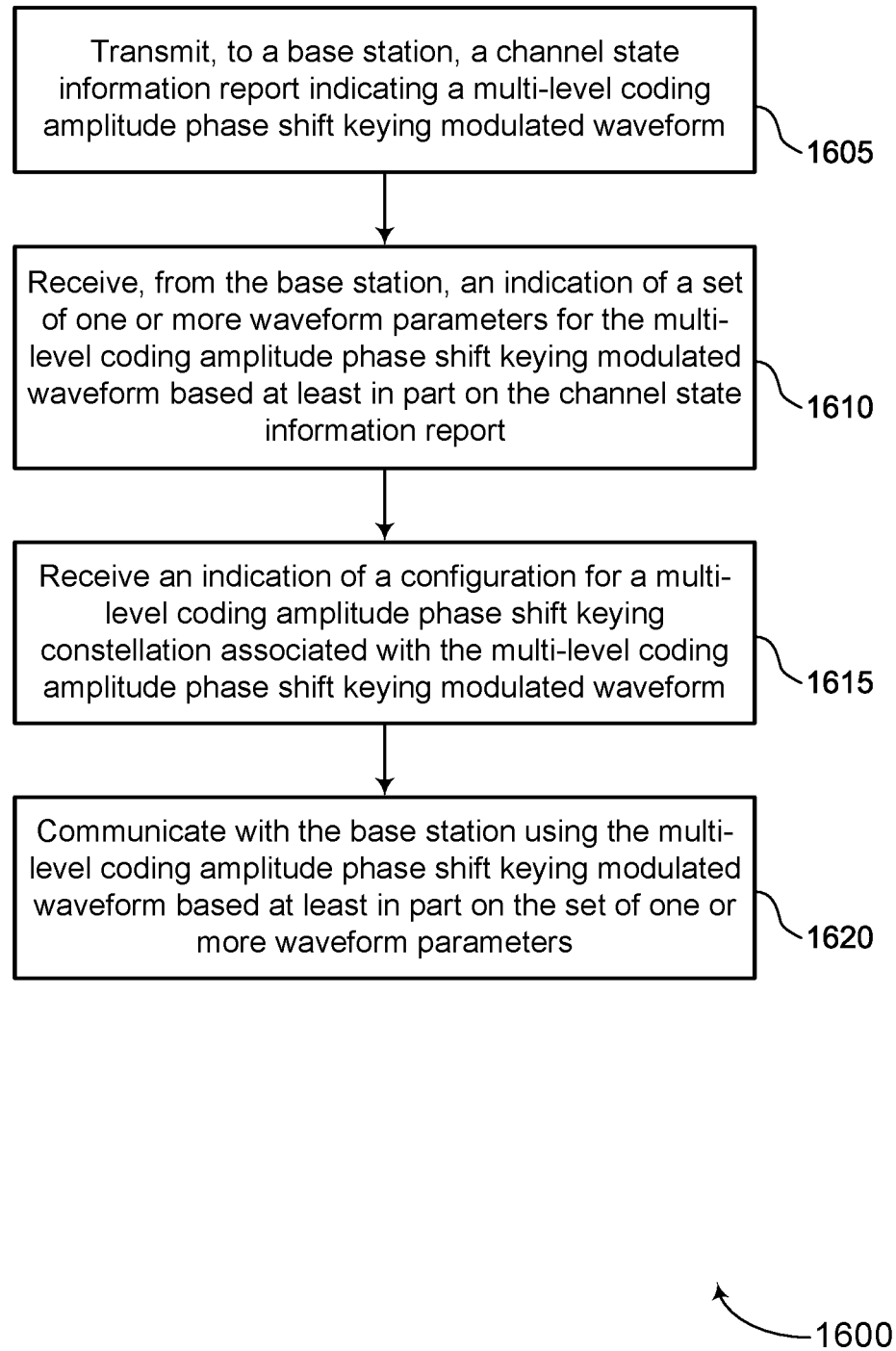

FIG. 16 shows a flowchart illustrating a method 1600 that supports a single carrier MLC APSK waveform in accordance with aspects of the present disclosure. The operations of the method 1600 may be implemented by a UE or its components as described herein. For example, the operations of the method 1600 may be performed by a UE 115 as described with reference to FIGS. 1-9. In some examples, a UE may execute a set of instructions to control the functional elements of the UE to perform the described functions. Additionally or alternatively, the UE may perform aspects of the described functions using special-purpose hardware.

At 1605, the method may include transmitting, to a base station, a CSI report indicating an MLC APSK modulated waveform. The operations of 1605 may be performed in accordance with examples as disclosed herein. In some examples, aspects of the operations of 1605 may be performed by a CSI report transmitter 825 as described with reference to FIG. 8.

At 1610, the method may include receiving, from the base station, an indication of a set of one or more waveform parameters for the MLC APSK modulated waveform based on the CSI report. The operations of 1610 may be performed in accordance with examples as disclosed herein. In some examples, aspects of the operations of 1610 may be performed by a parameter indication receiver 830 as described with reference to FIG. 8.

At 1615, the method may include receiving an indication of a configuration for an MLC APSK constellation associated with the MLC APSK modulated waveform. The operations of 1615 may be performed in accordance with examples as disclosed herein. In some examples, aspects of the operations of 1615 may be performed by a parameter indication receiver 830 as described with reference to FIG. 8.

At 1620, the method may include communicating with the base station using the MLC APSK modulated waveform based on the set of one or more waveform parameters. The operations of 1620 may be performed in accordance with examples as disclosed herein. In some examples, aspects of the operations of 1620 may be performed by an MLC APSK manager 835 as described with reference to FIG. 8.

Figure 17:
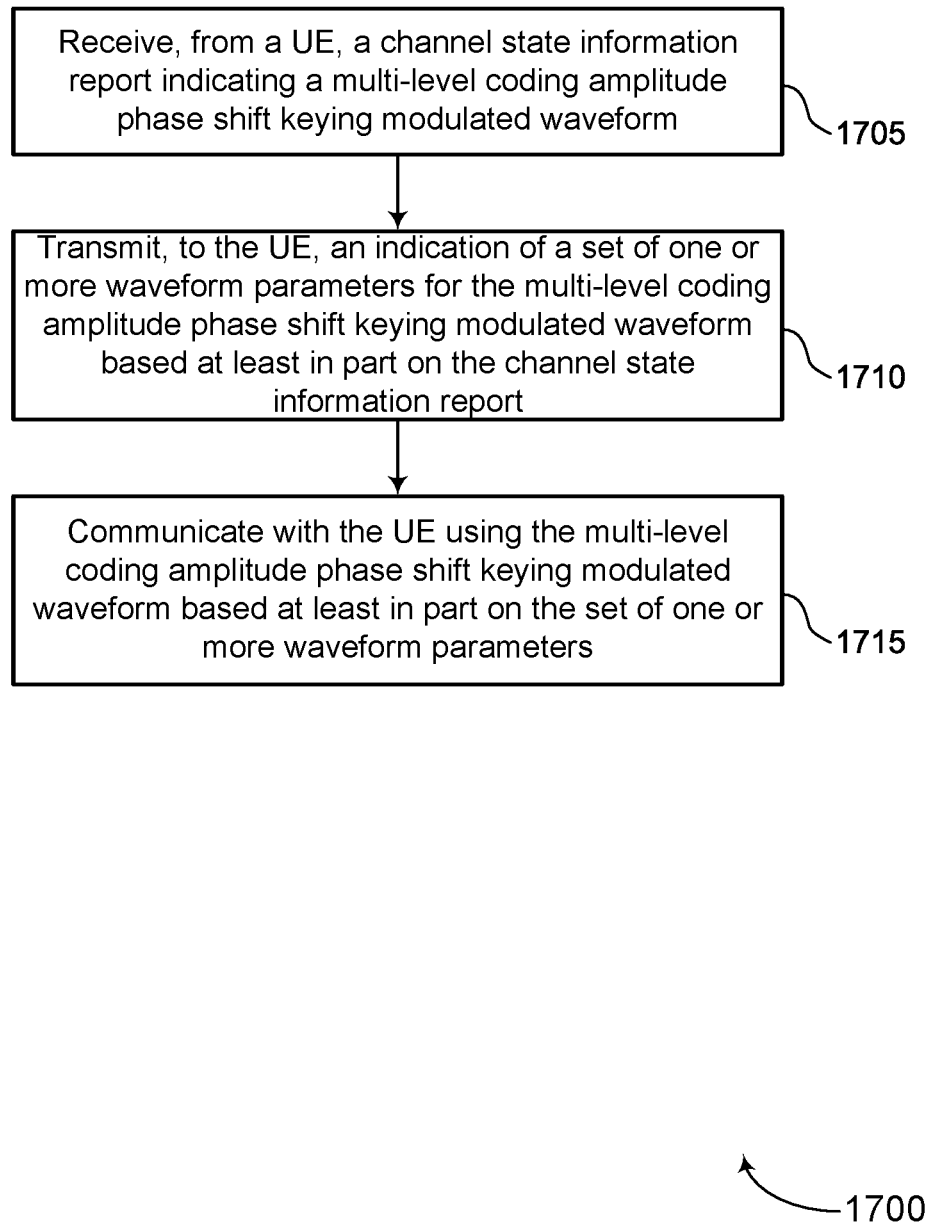

FIG. 17 shows a flowchart illustrating a method 1700 that supports a single carrier MLC APSK waveform in accordance with aspects of the present disclosure. The operations of the method 1700 may be implemented by a base station or its components as described herein. For example, the operations of the method 1700 may be performed by a base station 105 as described with reference to FIGS. 1-5 and 10-13. In some examples, a base station may execute a set of instructions to control the functional elements of the base station to perform the described functions. Additionally or alternatively, the base station may perform aspects of the described functions using special-purpose hardware.

At 1705, the method may include receiving, from a UE, a CSI report indicating an MLC APSK modulated waveform. The operations of 1705 may be performed in accordance with examples as disclosed herein. In some examples, aspects of the operations of 1705 may be performed by a CSI report receiver 1225 as described with reference to FIG. 12.

At 1710, the method may include transmitting, to the UE, an indication of a set of one or more waveform parameters for the MLC APSK modulated waveform based on the CSI report. The operations of 1710 may be performed in accordance with examples as disclosed herein. In some examples, aspects of the operations of 1710 may be performed by a parameter indication transmitter 1230 as described with reference to FIG. 12.

At 1715, the method may include communicating with the UE using the MLC APSK modulated waveform based on the set of one or more waveform parameters. The operations of 1715 may be performed in accordance with examples as disclosed herein. In some examples, aspects of the operations of 1715 may be performed by a modulated waveform transmitter 1235 as described with reference to FIG. 12.

Figure 18:
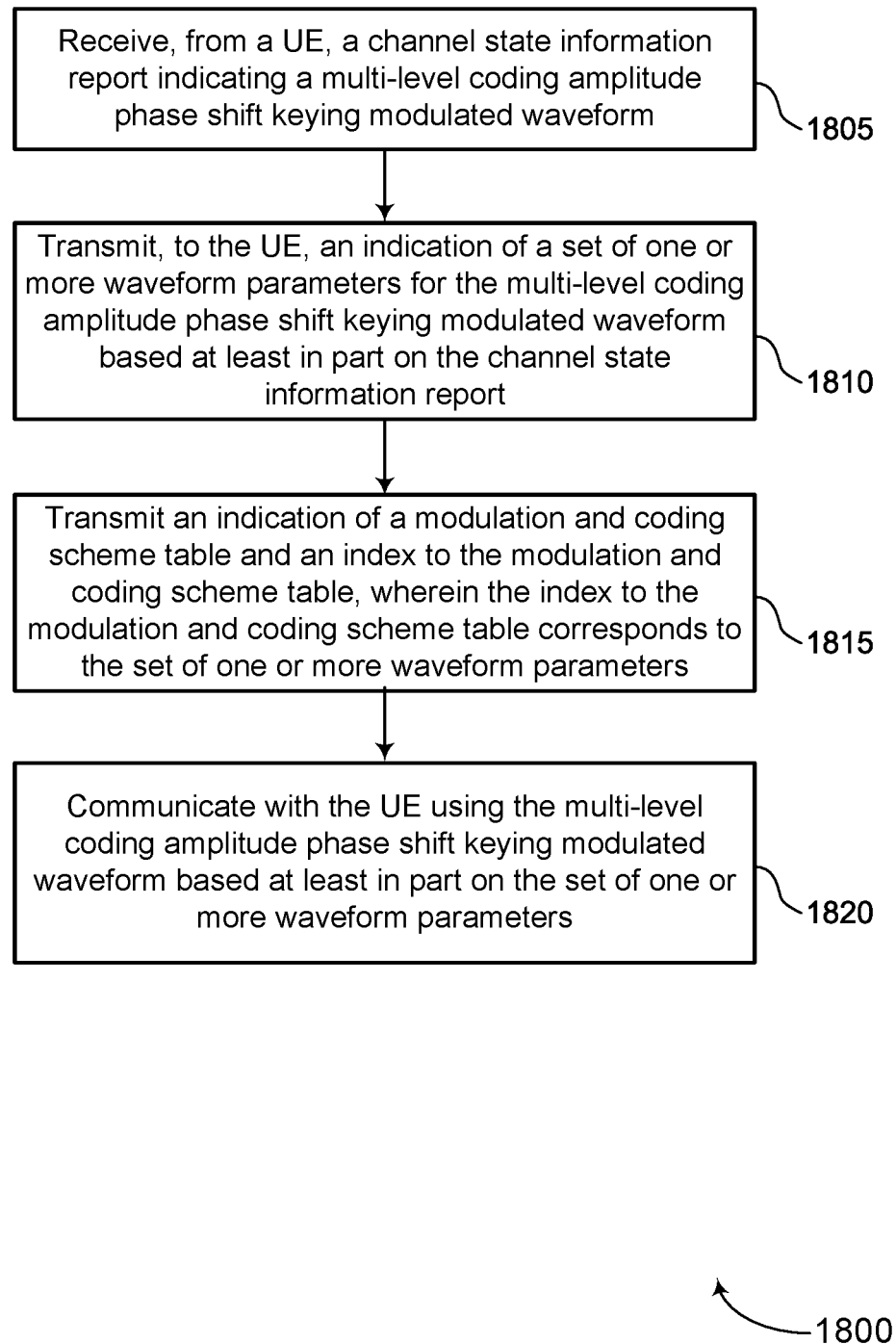

FIG. 18 shows a flowchart illustrating a method 1800 that supports a single carrier MLC APSK waveform in accordance with aspects of the present disclosure. The operations of the method 1800 may be implemented by a base station or its components as described herein. For example, the operations of the method 1800 may be performed by a base station 105 as described with reference to FIGS. 1-5 and 10-13. In some examples, a base station may execute a set of instructions to control the functional elements of the base station to perform the described functions. Additionally or alternatively, the base station may perform aspects of the described functions using special-purpose hardware.

At 1805, the method may include receiving, from a UE, a CSI report indicating an MLC APSK modulated waveform. The operations of 1805 may be performed in accordance with examples as disclosed herein. In some examples, aspects of the operations of 1805 may be performed by a CSI report receiver 1225 as described with reference to FIG. 12.

At 1810, the method may include transmitting, to the UE, an indication of a set of one or more waveform parameters for the MLC APSK modulated waveform based on the CSI report. The operations of 1810 may be performed in accordance with examples as disclosed herein. In some examples, aspects of the operations of 1810 may be performed by a parameter indication transmitter 1230 as described with reference to FIG. 12.

At 1815, the method may include transmitting an indication of an MCS table and an index to the MCS table, in which the index to the MCS table corresponds to the set of one or more waveform parameters. The operations of 1815 may be performed in accordance with examples as disclosed herein. In some examples, aspects of the operations of 1815 may be performed by a parameter indication transmitter 1230 as described with reference to FIG. 12.

At 1820, the method may include communicating with the UE using the MLC APSK modulated waveform based on the set of one or more waveform parameters. The operations of 1820 may be performed in accordance with examples as disclosed herein. In some examples, aspects of the operations of 1820 may be performed by a modulated waveform transmitter 1235 as described with reference to FIG. 12.

Figure 19:
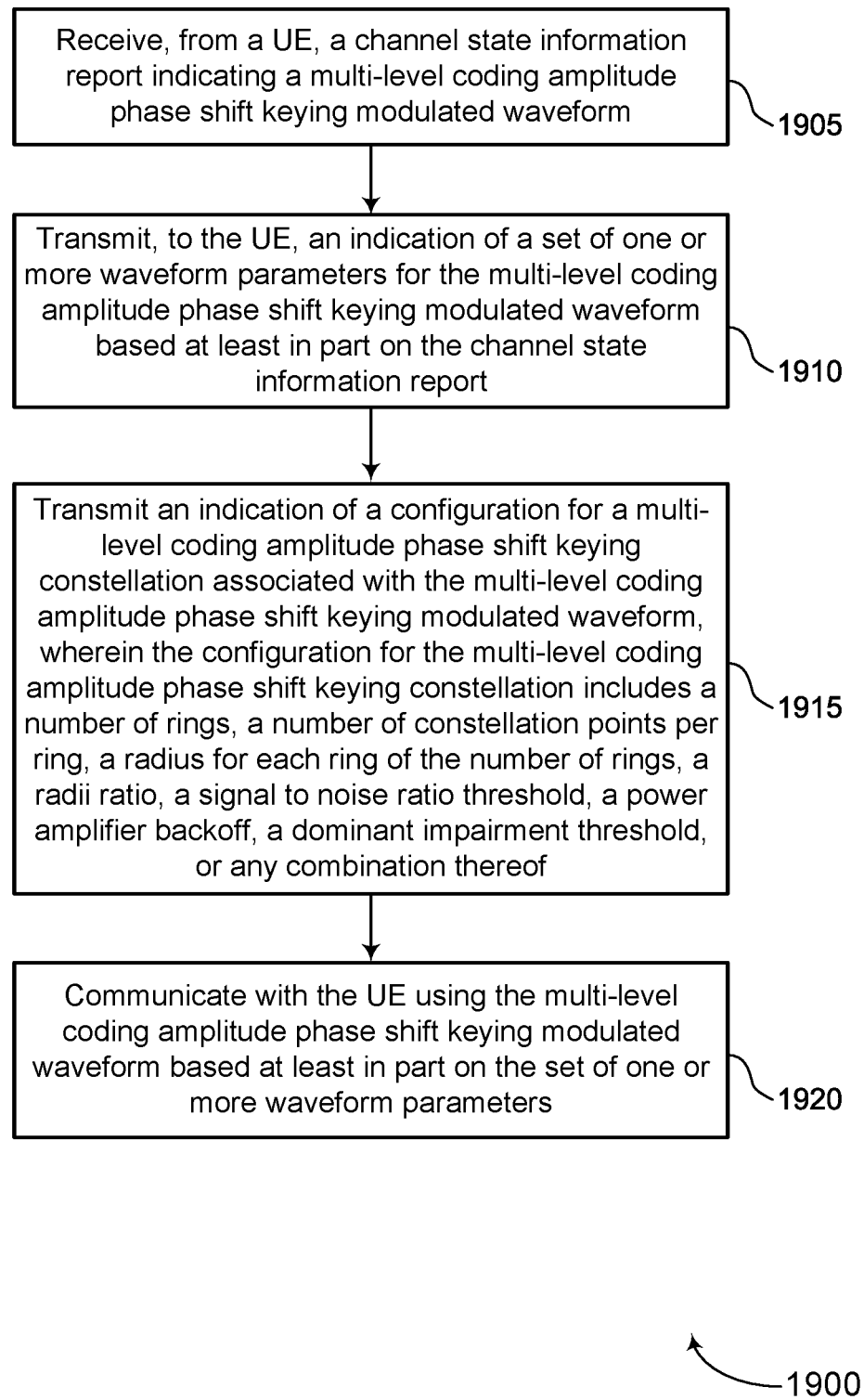

FIG. 19 shows a flowchart illustrating a method 1900 that supports a single carrier MLC APSK waveform in accordance with aspects of the present disclosure. The operations of the method 1900 may be implemented by a base station or its components as described herein. For example, the operations of the method 1900 may be performed by a base station 105 as described with reference to FIGS. 1-5 and 10-13. In some examples, a base station may execute a set of instructions to control the functional elements of the base station to perform the described functions. Additionally or alternatively, the base station may perform aspects of the described functions using special-purpose hardware.

At 1905, the method may include receiving, from a UE, a CSI report indicating an MLC APSK modulated waveform. The operations of 1905 may be performed in accordance with examples as disclosed herein. In some examples, aspects of the operations of 1905 may be performed by a CSI report receiver 1225 as described with reference to FIG. 12.

At 1910, the method may include transmitting, to the UE, an indication of a set of one or more waveform parameters for the MLC APSK modulated waveform based on the CSI report. The operations of 1910 may be performed in accordance with examples as disclosed herein. In some examples, aspects of the operations of 1910 may be performed by a parameter indication transmitter 1230 as described with reference to FIG. 12.

At 1915, the method may include transmitting an indication of a configuration for an MLC APSK constellation associated with the MLC APSK modulated waveform, in which the configuration for the MLC APSK constellation includes a number of rings, a number of constellation points associated with each ring, a radius for each ring of the number of rings, a radii ratio, an SNR threshold, a power amplifier backoff, a dominant impairment threshold, or any combination thereof. The operations of 1915 may be performed in accordance with examples as disclosed herein. In some examples, aspects of the operations of 1915 may be performed by a parameter indication transmitter 1230 as described with reference to FIG. 12.

At 1920, the method may include communicating with the UE using the MLC APSK modulated waveform based on the set of one or more waveform parameters. The operations of 1920 may be performed in accordance with examples as disclosed herein. In some examples, aspects of the operations of 1920 may be performed by a modulated waveform transmitter 1235 as described with reference to FIG. 12.

The following provides an overview of aspects of the present disclosure:

Aspect 1: A method for wireless communication at a UE, comprising: transmitting, to a base station, a channel state information report indicating a multi-level coding amplitude phase shift keying modulated waveform; receiving, from the base station, an indication of a set of one or more waveform parameters for the multi-level coding amplitude phase shift keying modulated waveform based at least in part on the channel state information report; and communicating with the base station using the multi-level coding amplitude phase shift keying modulated waveform based at least in part on the set of one or more waveform parameters.

Aspect 2: The method of aspect 1, wherein receiving the indication of the set of one or more waveform parameters comprises: receiving an indication of a modulation and coding scheme table and an index to the modulation and coding scheme table, the method further comprising: selecting the set of one or more waveform parameters from the modulation and coding scheme table based at least in part on the index.

Aspect 3: The method of any of aspects 1 through 2, wherein receiving the indication of the set of one or more waveform parameters comprises: receiving an indication of a configuration for a multi-level coding amplitude phase shift keying constellation associated with the multi-level coding amplitude phase shift keying modulated waveform.

Aspect 4: The method of any of aspects 1 through 3, wherein receiving the indication of the set of one or more waveform parameters comprises: receiving an indication that the multi-level coding amplitude phase shift keying modulated waveform is configured for multi-stage decoding or parallel-independence decoding.

Aspect 5: The method of any of aspects 1 through 4, wherein receiving the indication of the set of one or more waveform parameters comprises: receiving an indication of a modulation and coding scheme table of a plurality of modulation and coding scheme tables, wherein the modulation and coding scheme table includes a plurality of sets of one or more waveform parameters including the set of one or more waveform parameters.

Aspect 6: The method of any of aspects 1 through 5, wherein receiving the indication of the set of one or more waveform parameters comprises: receiving the indication of the set of one or more waveform parameters via a downlink control information message, radio resource control signaling, a medium access control control element, or any combination thereof.

Aspect 7: The method of any of aspects 1 through 6, further comprising: determining that a signal-to-noise ratio of a wireless channel between the UE and the base station satisfies a signal-to-noise ratio threshold, wherein the communicating with the base station using the multi-level coding amplitude phase shift keying modulated waveform is based at least in part on satisfaction of the signal-to-noise ratio threshold.

Aspect 8: The method of aspect 7, wherein the signal-to-noise ratio threshold is based at least in part on a phase noise of the wireless channel, a delay spread of the wireless channel, a doppler spread of the wireless channel, or any combination thereof.

Aspect 9: The method of any of aspects 1 through 8, wherein transmitting the channel state information report comprises: transmitting a request of the set of one or more waveform parameters for the multi-level coding amplitude phase shift keying modulated waveform.

Aspect 10: The method of any of aspects 1 through 9, wherein the multi-level coding amplitude phase shift keying modulated waveform is a single carrier multi-level coding amplitude phase shift keying waveform.

Aspect 11: The method of any of aspects 1 through 10, further comprising: transmitting an indication of a UE capability for communicating using the multi-level coding amplitude phase shift keying modulated waveform, wherein the indication of the set of one or more waveform parameters is received based at least in part on the indication of the UE capability.

Aspect 12: The method of any of aspects 1 through 11, wherein communicating with the base station using the multi-level coding amplitude phase shift keying modulated waveform comprises: transmitting a signal having the multi-level coding amplitude phase shift keying modulated waveform to the base station based at least in part on the set of one or more waveform parameters; or receiving a signal having the multi-level coding amplitude phase shift keying modulated waveform from the base station based at least in part on the set of one or more waveform parameters.

Aspect 13: A method for wireless communication at a base station, comprising: receiving, from a UE, a channel state information report indicating a multi-level coding amplitude phase shift keying modulated waveform; transmitting, to the UE, an indication of a set of one or more waveform parameters for the multi-level coding amplitude phase shift keying modulated waveform based at least in part on the channel state information report; and communicating with the UE using the multi-level coding amplitude phase shift keying modulated waveform based at least in part on the set of one or more waveform parameters.

Aspect 14: The method of aspect 13, wherein transmitting the indication of the set of one or more waveform parameters comprises: transmitting an indication of a modulation and coding scheme table and an index to the modulation and coding scheme table corresponding to the set of one or more waveform parameters.

Aspect 15: The method of any of aspects 13 through 14, wherein transmitting the indication of the set of one or more waveform parameters comprises: transmitting an indication of a configuration for a multi-level coding amplitude phase shift keying constellation associated with the multi-level coding amplitude phase shift keying modulated waveform, wherein the configuration for the multi-level coding amplitude phase shift keying constellation includes a number of rings, a number of constellation points per ring, a radius for each ring of the number of rings, a radii ratio, a signal to noise ratio threshold, a power amplifier backoff, a dominant impairment threshold, or any combination thereof.

Aspect 16: The method of any of aspects 13 through 15, wherein transmitting the indication of the set of one or more waveform parameters comprises: transmitting an indication that the multi-level coding amplitude phase shift keying modulated waveform is configured for multi-stage decoding or parallel-independence decoding.

Aspect 17: The method of any of aspects 13 through 16, wherein transmitting the indication of the set of one or more waveform parameters comprises: transmitting an indication of a modulation and coding scheme table of a plurality of modulation and coding scheme tables, wherein the modulation and coding scheme table includes a plurality of sets of one or more waveform parameters including the set of one or more waveform parameters.

Aspect 18: The method of any of aspects 13 through 17, wherein transmitting the indication of the set of one or more waveform parameters comprises: transmitting the indication of the set of one or more waveform parameters via a downlink control information message, radio resource control signaling, a medium access control control element, or any combination thereof.

Aspect 19: The method of any of aspects 13 through 18, further comprising: determining that a signal-to-noise ratio of a wireless channel between the UE and the base station satisfies a signal-to-noise ratio threshold, wherein the communicating with the UE using the multi-level coding amplitude phase shift keying modulated waveform is based at least in part on satisfaction of the signal-to-noise ratio threshold.

Aspect 20: The method of aspect 19, wherein the signal-to-noise ratio threshold is based at least in part on a phase noise of the wireless channel, a delay spread of the wireless channel, a doppler spread of the wireless channel, or any combination thereof.

Aspect 21: The method of any of aspects 13 through 20, wherein receiving the channel state information report comprises: receiving a request of the set of one or more waveform parameters for the multi-level coding amplitude phase shift keying modulated waveform.

Aspect 22: The method of any of aspects 13 through 21, wherein the multi-level coding amplitude phase shift keying modulated waveform is a single-carrier multi-level coding amplitude phase shift keying modulated waveform.

Aspect 23: The method of any of aspects 13 through 22, further comprising: receiving an indication of a UE capability for communicating using the multi-level coding amplitude phase shift keying modulated waveform, wherein the indication of the set of one or more waveform parameters is transmitted based at least in part on the indication of the UE capability.

Aspect 24: The method of any of aspects 13 through 23, wherein communicating with the UE using the multi-level coding amplitude phase shift keying modulated waveform comprises: receiving a signal having the multi-level coding amplitude phase shift keying modulated waveform from the UE based at least in part on the set of one or more waveform parameters; or transmitting a signal with the multi-level coding amplitude phase shift keying modulated waveform to the UE based at least in part on the set of one or more waveform parameters.

Aspect 25: An apparatus for wireless communication at a UE, comprising a processor; memory coupled with the processor; and instructions stored in the memory and executable by the processor to cause the apparatus to perform a method of any of aspects 1 through 12.

Aspect 26: An apparatus for wireless communication at a UE, comprising at least one means for performing a method of any of aspects 1 through 12.

Aspect 27: A non-transitory computer-readable medium storing code for wireless communication at a UE, the code comprising instructions executable by a processor to perform a method of any of aspects 1 through 12.

Aspect 28: An apparatus for wireless communication at a base station, comprising a processor; memory coupled with the processor; and instructions stored in the memory and executable by the processor to cause the apparatus to perform a method of any of aspects 13 through 24.

Aspect 29: An apparatus for wireless communication at a base station, comprising at least one means for performing a method of any of aspects 13 through 24.

Aspect 30: A non-transitory computer-readable medium storing code for wireless communication at a base station, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc in which disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions, in which "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. The disclosure is not limited to the examples and designs described herein but is to be accorded the broadest scope consistent with the principles and novel features disclosed herein.

What is claimed is:

1. A method for wireless communication at a user equipment (UE), comprising:
    transmitting, to a base station, a channel state information report indicating a multi-level coding amplitude phase shift keying modulated waveform;
    receiving, from the base station, an indication of a set of one or more waveform parameters for the multi-level coding amplitude phase shift keying modulated waveform based at least in part on the channel state information report; and
    communicating with the base station using the multi-level coding amplitude phase shift keying modulated waveform based at least in part on the set of one or more waveform parameters.

2. The method of claim 1, wherein receiving the indication of the set of one or more waveform parameters comprises:
    receiving an indication of a modulation and coding scheme table and an index to the modulation and coding scheme table, the method further comprising:
    selecting the set of one or more waveform parameters from the modulation and coding scheme table based at least in part on the index.

3. The method of claim 1, wherein receiving the indication of the set of one or more waveform parameters comprises receiving an indication of a configuration for a multi-level coding amplitude phase shift keying constellation associated with the multi-level coding amplitude phase shift keying modulated waveform.

4. The method of claim 1, wherein receiving the indication of the set of one or more waveform parameters comprises receiving an indication that the multi-level coding amplitude phase shift keying modulated waveform is configured for multi-stage decoding or parallel-independence decoding.

5. The method of claim 1, wherein receiving the indication of the set of one or more waveform parameters comprises receiving an indication of a modulation and coding scheme table of a plurality of modulation and coding scheme tables, wherein the modulation and coding scheme table includes a plurality of sets of one or more waveform parameters including the set of one or more waveform parameters.

6. The method of claim 1, wherein receiving the indication of the set of one or more waveform parameters comprises receiving the indication of the set of one or more waveform parameters via a downlink control information message, radio resource control signaling, or a medium access control control element.

7. The method of claim 1, further comprising determining that a signal-to-noise ratio of a wireless channel between the UE and the base station satisfies a signal-to-noise ratio threshold, wherein the communicating with the base station using the multi-level coding amplitude phase shift keying modulated waveform is based at least in part on satisfaction of the signal-to-noise ratio threshold.

8. The method of claim 7, wherein the signal-to-noise ratio threshold is based at least in part on a phase noise of the wireless channel, a delay spread of the wireless channel, or a doppler spread of the wireless channel.

9. The method of claim 1, wherein transmitting the channel state information report comprises transmitting a request of the set of one or more waveform parameters for the multi-level coding amplitude phase shift keying modulated waveform.

10. The method of claim 1, wherein the multi-level coding amplitude phase shift keying modulated waveform is a single carrier multi-level coding amplitude phase shift keying waveform.

11. The method of claim 1, further comprising transmitting an indication of a UE capability for communicating using the multi-level coding amplitude phase shift keying modulated waveform, wherein the indication of the set of one or more waveform parameters is received based at least in part on the indication of the UE capability.

12. The method of claim 1, wherein communicating with the base station using the multi-level coding amplitude phase shift keying modulated waveform comprises:
    transmitting a signal having the multi-level coding amplitude phase shift keying modulated waveform to the base station based at least in part on the set of one or more waveform parameters; or
    receiving a signal having the multi-level coding amplitude phase shift keying modulated waveform from the base station based at least in part on the set of one or more waveform parameters.

13. A method for wireless communication at a base station, comprising:
    receiving, from a user equipment (UE), a channel state information report indicating a multi-level coding amplitude phase shift keying modulated waveform;
    transmitting, to the UE, an indication of a set of one or more waveform parameters for the multi-level coding amplitude phase shift keying modulated waveform based at least in part on the channel state information report; and
    communicating with the UE using the multi-level coding amplitude phase shift keying modulated waveform based at least in part on the set of one or more waveform parameters.

14. The method of claim 13, wherein transmitting the indication of the set of one or more waveform parameters comprises transmitting an indication of a modulation and coding scheme table and an index to the modulation and coding scheme table corresponding to the set of one or more waveform parameters.

15. The method of claim 13, wherein transmitting the indication of the set of one or more waveform parameters comprises transmitting an indication of a configuration for a multi-level coding amplitude phase shift keying constellation associated with the multi-level coding amplitude phase shift keying modulated waveform, wherein the configuration for the multi-level coding amplitude phase shift keying constellation includes a number of rings, a number of constellation points per ring, a radius for each ring of the number of rings, a radii ratio, a signal to noise ratio threshold, a power amplifier backoff, or a dominant impairment threshold.

16. The method of claim 13, wherein transmitting the indication of the set of one or more waveform parameters comprises transmitting an indication that the multi-level coding amplitude phase shift keying modulated waveform is configured for multi-stage decoding or parallel-independence decoding.

17. The method of claim 13, wherein transmitting the indication of the set of one or more waveform parameters comprises transmitting an indication of a modulation and coding scheme table of a plurality of modulation and coding scheme tables, wherein the modulation and coding scheme table includes a plurality of sets of one or more waveform parameters including the set of one or more waveform parameters.

18. The method of claim 13, wherein transmitting the indication of the set of one or more waveform parameters comprises transmitting the indication of the set of one or more waveform parameters via a downlink control information message, radio resource control signaling, or a medium access control control element.

19. The method of claim 13, further comprising determining that a signal-to-noise ratio of a wireless channel between the UE and the base station satisfies a signal-to-noise ratio threshold, wherein the communicating with the UE using the multi-level coding amplitude phase shift keying modulated waveform is based at least in part on satisfaction of the signal-to-noise ratio threshold.

20. The method of claim 19, wherein the signal-to-noise ratio threshold is based at least in part on a phase noise of the wireless channel, a delay spread of the wireless channel, or a doppler spread of the wireless channel.

21. The method of claim 13, wherein receiving the channel state information report comprises receiving a request of the set of one or more waveform parameters for the multi-level coding amplitude phase shift keying modulated waveform.

22. The method of claim 13, wherein the multi-level coding amplitude phase shift keying modulated waveform is a single-carrier multi-level coding amplitude phase shift keying modulated waveform.

23. The method of claim 13, further comprising receiving an indication of a UE capability for communicating using the multi-level coding amplitude phase shift keying modulated waveform, wherein the indication of the set of one or more waveform parameters is transmitted based at least in part on the indication of the UE capability.

24. The method of claim 13, wherein communicating with the UE using the multi-level coding amplitude phase shift keying modulated waveform comprises:
    receiving a signal having the multi-level coding amplitude phase shift keying modulated waveform from the UE based at least in part on the set of one or more waveform parameters; or
    transmitting a signal with the multi-level coding amplitude phase shift keying modulated waveform to the UE based at least in part on the set of one or more waveform parameters.

25. An apparatus for wireless communication at a user equipment (UE), comprising:
    a processor;
    memory coupled with the processor; and
    instructions stored in the memory and executable by the processor to cause the apparatus to:
        transmit, to a base station, a channel state information report indicating a multi-level coding amplitude phase shift keying modulated waveform;
        receive, from the base station, an indication of a set of one or more waveform parameters for the multi-level coding amplitude phase shift keying modulated waveform based at least in part on the channel state information report; and
        communicate with the base station using the multi-level coding amplitude phase shift keying modulated waveform based at least in part on the set of one or more waveform parameters.

26. The apparatus of claim 25, wherein the instructions to receive the indication of the set of one or more waveform parameters are executable by the processor to cause the apparatus to:

receive an indication of a modulation and coding scheme table and an index to the modulation and coding scheme table; and select the set of one or more waveform parameters from the modulation and coding scheme table according to the index.

27. The apparatus of claim 25, wherein the instructions to receive the indication of the set of one or more waveform parameters are executable by the processor to cause the apparatus to receive an indication of a configuration for a multi-level coding amplitude phase shift keying constellation associated with the multi-level coding amplitude phase shift keying modulated waveform.

28. An apparatus for wireless communication at a base station, comprising:

a processor;

memory coupled with the processor; and instructions stored in the memory and executable by the processor to cause the apparatus to:

receive, from a user equipment (UE), a channel state information report indicating a multi-level coding amplitude phase shift keying modulated waveform;

transmit, to the UE, an indication of a set of one or more waveform parameters for the multi-level coding amplitude phase shift keying modulated waveform based at least in part on the channel state information report; and communicate with the UE using the multi-level coding amplitude phase shift keying modulated waveform based at least in part on the set of one or more waveform parameters.

29. The apparatus of claim 28, wherein the instructions to transmit the indication of the set of one or more waveform parameters are executable by the processor to cause the apparatus to transmit an indication of a modulation and coding scheme table and an index to the modulation and coding scheme table, wherein the index to the modulation and coding scheme table corresponds to the set of one or more waveform parameters.

30. The apparatus of claim 28, wherein the instructions to transmit the indication of the set of one or more waveform parameters are executable by the processor to cause the apparatus to transmit an indication of a configuration for a multi-level coding amplitude phase shift keying constellation associated with the multi-level coding amplitude phase shift keying waveform, wherein the configuration for the multi-level coding amplitude phase shift keying constellation includes a number of rings, a number of constellation points per ring, a radius for each ring of the number of rings, a radii ratio, a signal to noise ratio threshold, a power amplifier backoff, a dominant impairment threshold, or any combination thereof.

* * * * *